United States Patent [19]

Kakinami et al.

[11] Patent Number: 5,197,562
[45] Date of Patent: Mar. 30, 1993

[54] VEHICLE CRUISING CONTROL DEVICE

[75] Inventors: Toshiaki Kakinami, Ibaraki; Takashi Hida, Aichi; Jun Sato; Mitsuyoshi Saiki, both of Ibaraki, all of Japan

[73] Assignee: Aisin Seiki K.K., Kariya, Japan

[21] Appl. No.: 693,261

[22] Filed: Apr. 29, 1991

[30] Foreign Application Priority Data

Apr. 28, 1990 [JP] Japan .................................. 2-112336

[51] Int. Cl.⁵ .......................... B60T 7/16; B60K 31/02
[52] U.S. Cl. .................................... 180/169; 180/170;
180/178; 340/435; 358/103; 364/426.04
[58] Field of Search ........................ 358/103; 340/435;
364/424.01, 426.04; 180/169, 167, 168, 170,
175, 176, 177, 178, 179

[56] References Cited

U.S. PATENT DOCUMENTS

| | | | |
|---|---|---|---|
| 4,195,425 | 4/1980 | Leitz | 180/169 |
| 4,621,705 | 11/1986 | Etoh | 180/169 |
| 4,622,636 | 11/1986 | Tachibana | 180/169 |
| 4,703,429 | 10/1987 | Sakata | 180/169 |
| 4,706,195 | 11/1987 | Yoshino | 180/169 |
| 4,833,469 | 5/1989 | David | 180/169 |
| 4,931,937 | 6/1990 | Kakinami | 180/169 |
| 4,970,652 | 11/1990 | Nagashima | 364/424.01 |
| 5,014,200 | 5/1991 | Chundrlik | 180/170 |
| 5,053,979 | 10/1991 | Etoh | 180/169 |

Primary Examiner—David M. Mitchell
Attorney, Agent, or Firm—Sughrue, Mion, Zinn, Macpeak & Seas

[57] ABSTRACT

A vehicle cruising control device includes a detecting device for detecting the current speed of the vehicle, a constant speed control device for maintaining the speed of the vehicle at a selected speed, a measuring device for measuring the current inter-vehicle distance between the vehicle and an advance vehicle and an inter-vehicle distance control device for maintaining the inter-vehicle distance between the vehicle and the advance vehicle at a predetermined distance based on the degree of danger determined by the relationship of the current distance between vehicles and the relative speed between the vehicles. A switching device is provided for turning on either of the constant speed control device and the inter-vehicle distance control device.

6 Claims, 22 Drawing Sheets

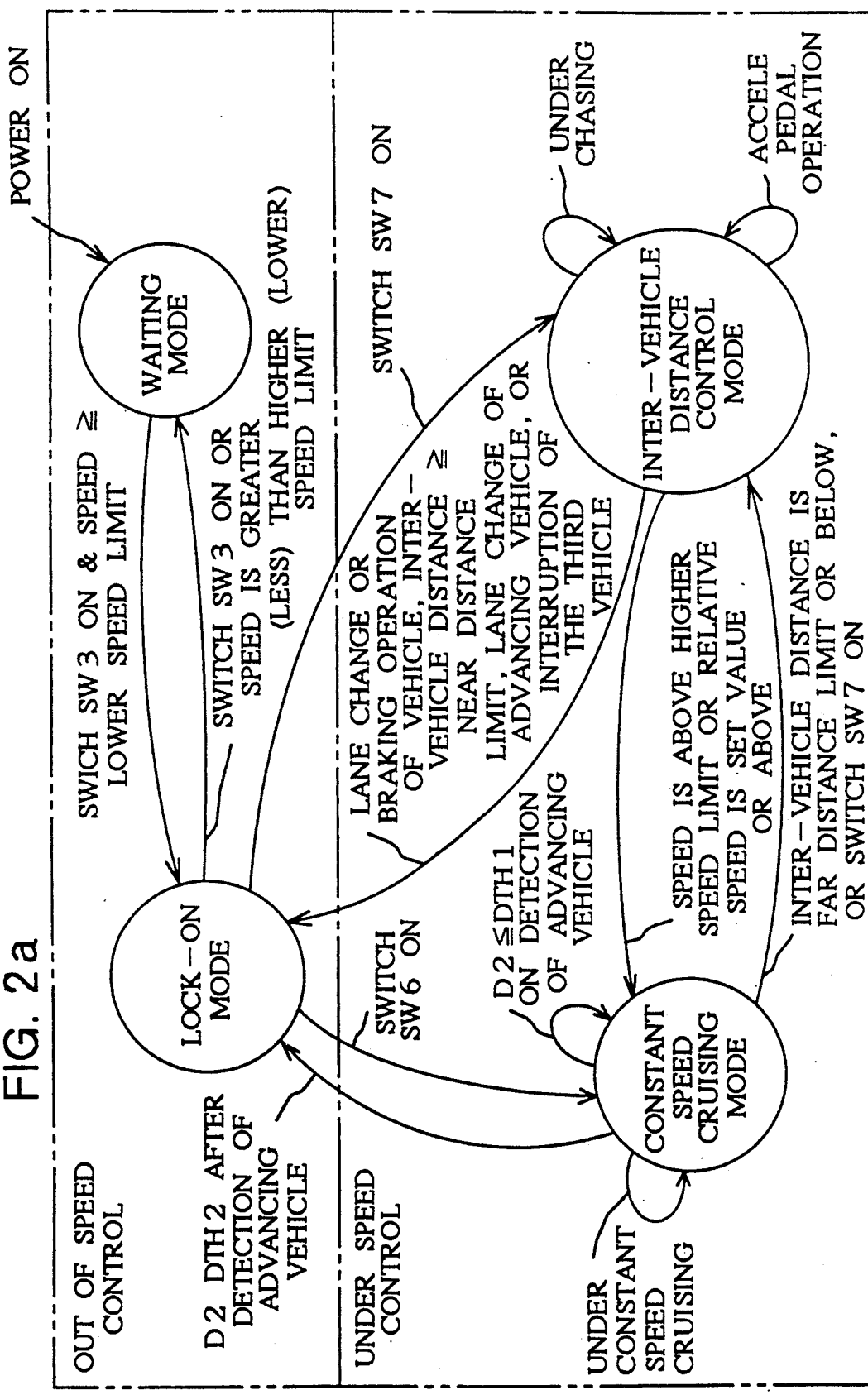

FIG. 2b

| CURRENT MODE | MODE AFTER TRANSFER | A.D. | PHRASE ||| INDICATOR | ALARM | NOTE |
| --- | --- | --- | --- | --- | --- | --- | --- | --- |
| | | | CONSTANT SPEED CRUISING | ADVANCING VEHICLE | INTER-VEHICLE DISTANCE | | | |
| WAITING | NO TRANSFER | OFF | OFF | OFF | OFF | OFF | OFF | |
| | LOCK-ON | ON | OFF | OFF | OFF | OFF | 1-SHOT | A |
| | NO TRANSFER | | OFF | OFF FLICKER | OFF | OFF FLICKER | OFF ON-OFF | B C |
| | NO TRANSFER | | | | | | | |
| LOCK-ON | WAITING CONSTANT SPEED CRUISING INTER-VEHICLE DISTANCE | | | | | | 1-SHOT | A |
| | NO TRANSFER | ON | ON | OFF FLICKER | OFF | OFF FLICKER | OFF ON-OFF | B C |
| | NO TRANSFER | | | | | | | |
| CONSTANT SPEED CRUISING | WAITING LOCK-ON INTER-VEHICLE DISTANCE | | | OFF AFTER HIGH SPEED FLICKER | | | OFF AFTER HIGH SPEED FLICKER | D |
| | WAITING LOCK-ON INTER-VEHICLE DISTANCE | | | | | | | |
| | NO TRANSFER | ON | OFF | ON | ON | ON | OFF | A |
| INTER-VEHICLE DISTANCE | WAITING LOCK-ON CONSTANT SPEED CRUISING | | | | OFF AFTER HIGH SPEED FLICKER | | OFF AFTER HIGH SPEED FLICKER | D |
| | WAITING LOCK-ON CONSTANT SPEED CRUISING | | | | | | 1-SHOT | A |

NOTE:
1 BLANK COLOUMN DENOTES NO FUNCTION OR OPERATION
2 (A) DENOTES "MANUAL TRANSFER"
3 (B) DENOTES "NO DETECTION OF ADVANCING VEHICLE"
4 (C) DENOTES "UNDER DETECTION OF ADVANCING VEHICLE"
5 (D) DENOTES "AUTOMATICAL TRANSFER"

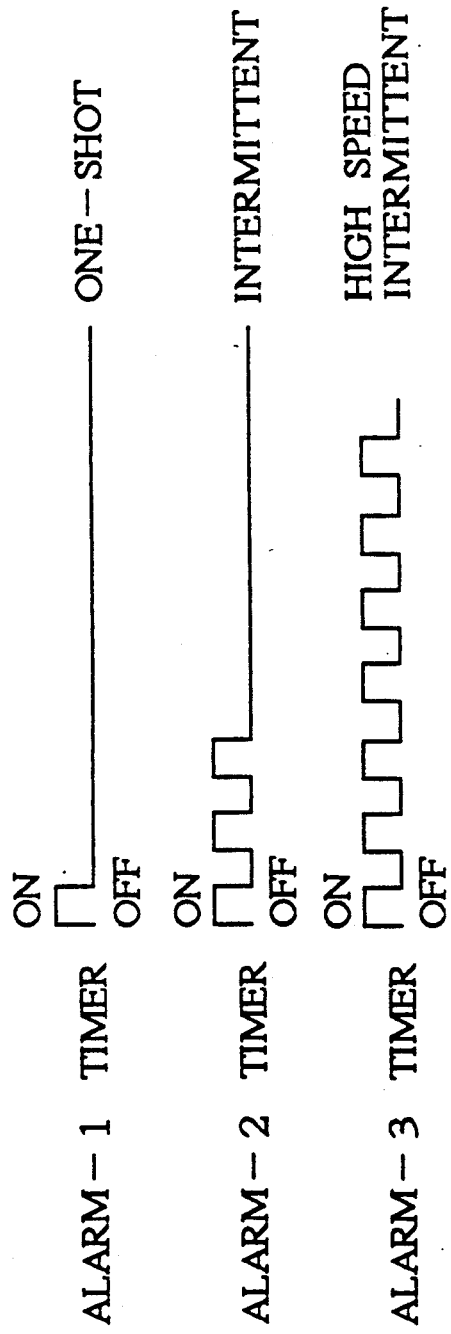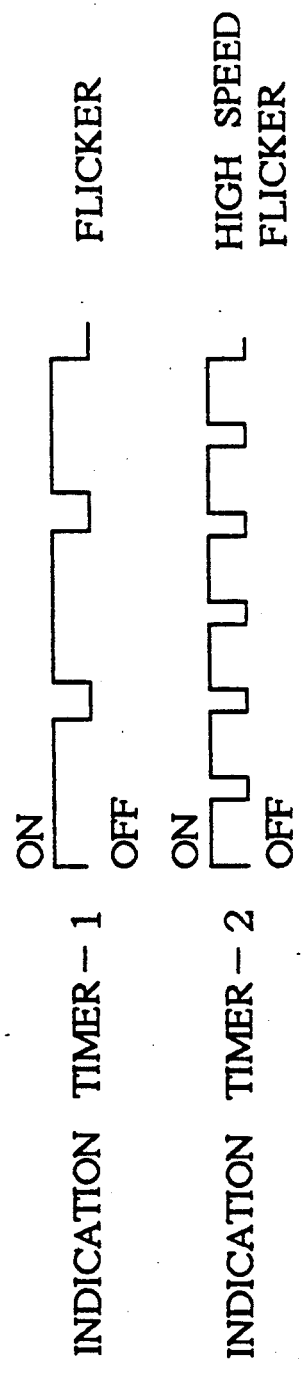

1-9 : WAITING MODE

1: INITIALIZATION
2: A. D. CONTROL OFF
3: DISAPPEAR INDICATOR
4: DISAPPEAR ALL PHRASES
5: ALARM OFF
6: IS SPEED LOWER SPEED LIMIT OR ABOVE ?
7: IS SPEED HIGHER SPEED LIMIT OR LESS ?
8: IS SWITCH SW3 ON ?
9: SET ALARM-1

10-31 : LOCK-ON MODE
10 : DISPLAY "A. D."
11 : DISAPPEAR "CONSTANT SPEED CRUISING" "ADVANCING VEHICLE" AND "INTER-VEHICLE DISTANCE"
12 : ALARM OFF
13 : A. D. CONTROL OFF
14 : IS SWITCH SW3 ON ?
15 : IS SPEED LOWER SPEED LIMIT OR ABOVE ?
16 : IS SPEED HIGHER SPEED LIMIT OR LESS ?
17 : IMAGE EXTRACTION
31 : SET ALARM-1

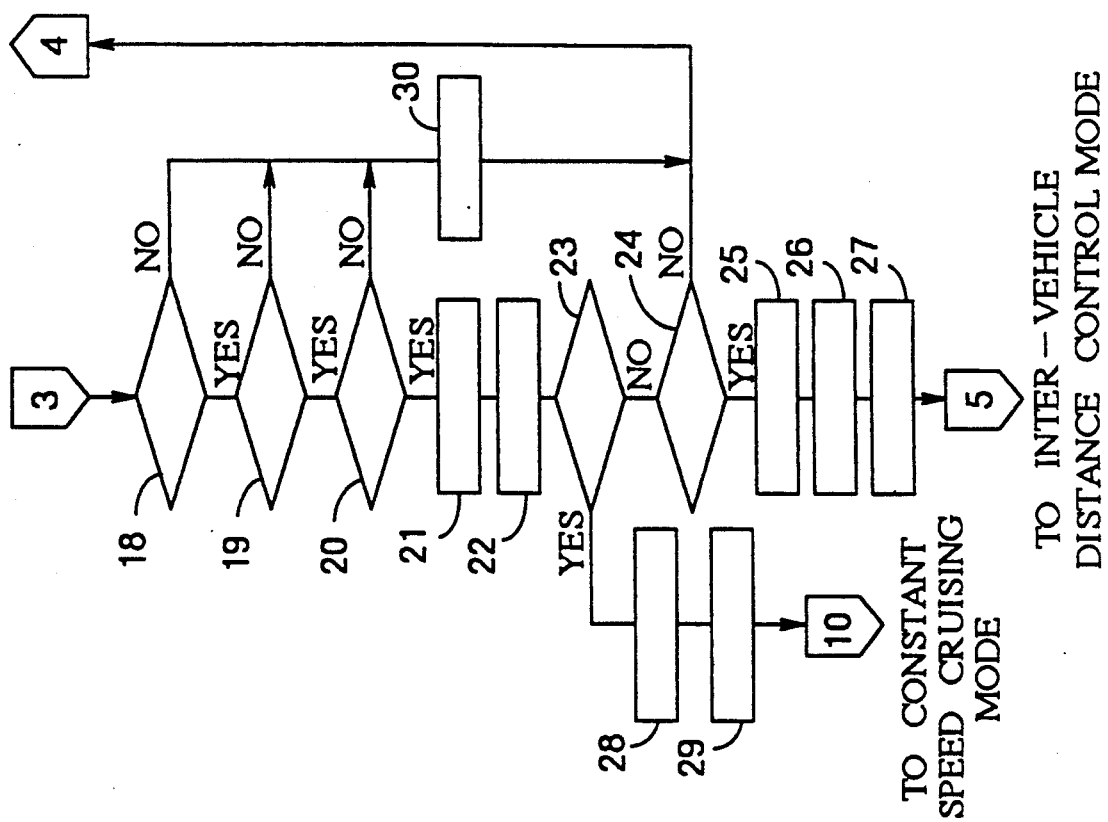

FIG. 5c

18 : IS DETECTION FLAG ON ?
19 : IS INTER-VEHICLE DISTANCE FAR DISTANCE LIMIT OR LESS ?
20 : IS INTER-VEHICLE DISTANCE NEAR DISTANCE OR ABOVE ?
21 : SET "ADVANCING VEHICLE" BY INDICATOR AND TIMER-1
22 : SET ALARM-2
23 : IS SWITCH SW6 ON ?
24 : IS SWITCH SW7 ON ?
25 : SET ALARM-1
26 : REGISTRATION OF REFERENCE SPEED
27 : REGISTRATION OF REFERENCE DISTANCE
28 : SET ALARM-1
29 : REGISTRATION OF REFERENCE SPEED
30 : DISAPPEAR INDICATOR

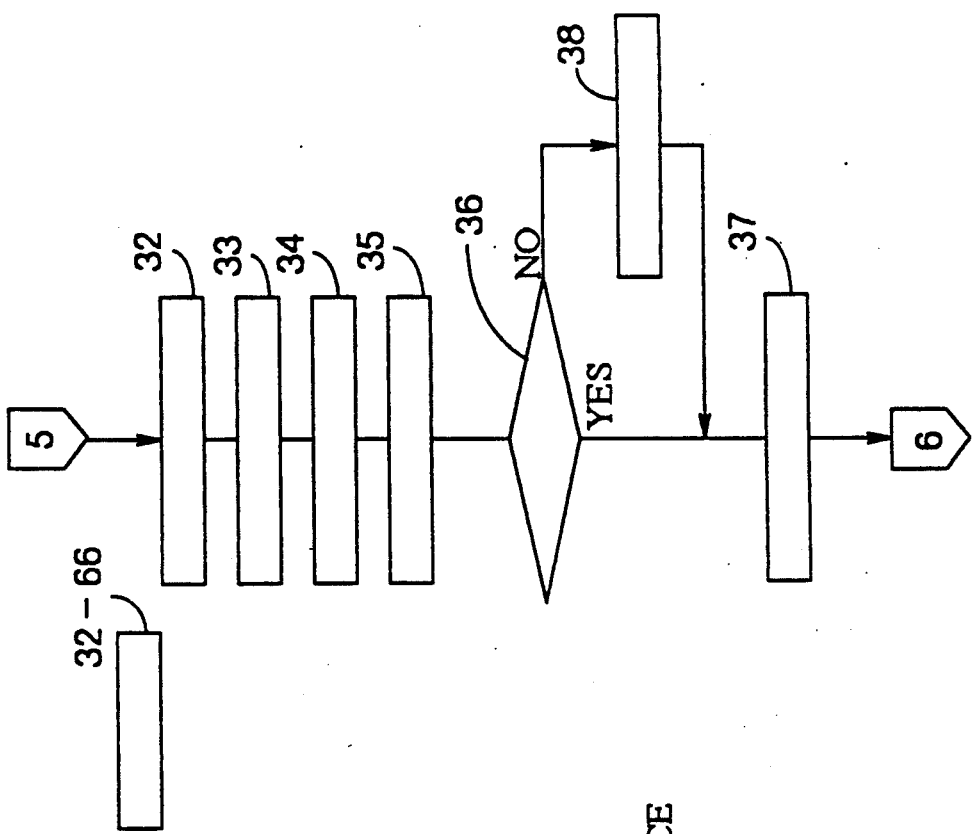

FIG. 5d 32-66 : INTER-VEHICLE DISTANCE CONTROL MODE

32 : DISPLAY "A.D.", "INTER-VEHICLE DISTANCE" AND "ADVANCING VEHICLE"

33 : DISAPPEAR "CONSTANT SPEED CRUISING"

34 : ALARM OFF

35 : CALCULATION OF DECELERATION BY USING REFERENCE SPEED AND DISTANCE

36 : IS DECELERATION MAXIMUM PERMITTED VALUE OR LESS ?

37 : ESTABLISH FUNCTION OF SPEED/BRAKING DISTANCE

38 : REGARD MAXIMUM PERMITTED VALUE AS DECELERATION

FIG. 5e

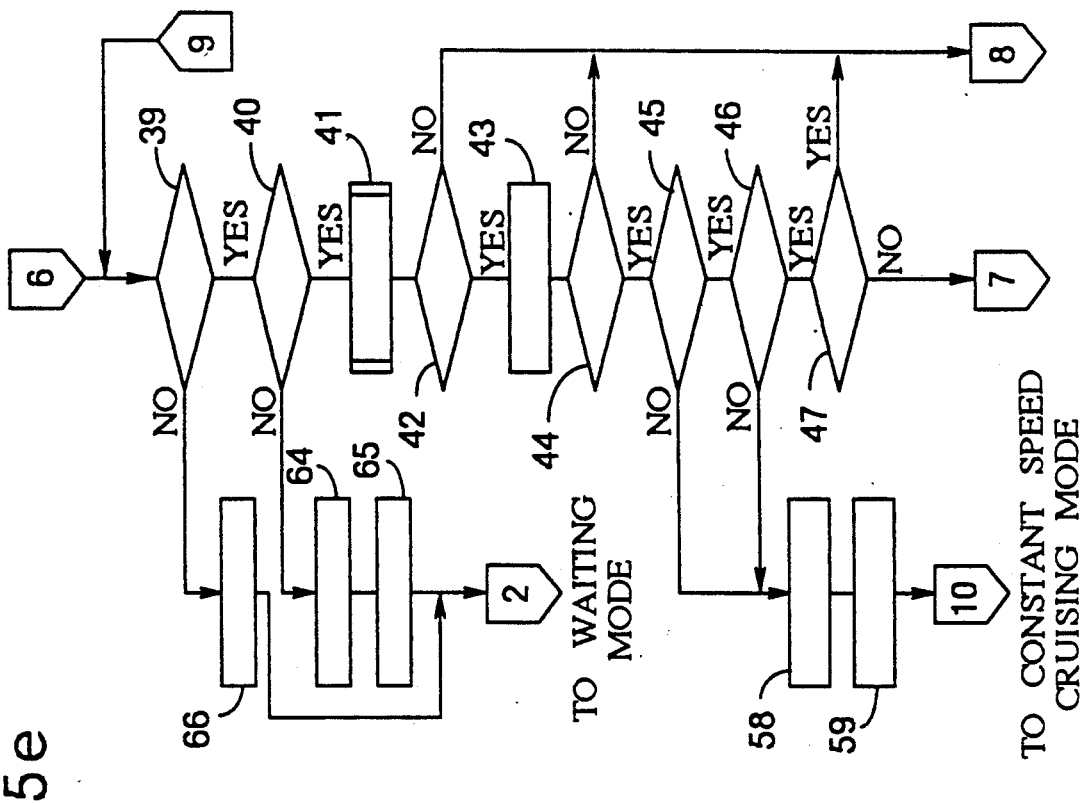

39 : SWITCH SW3 ON
40 : IS ACTUAL VEHICLE SPEED LOWER SPEED LIMIT OR ABOVE ?
41 : IMAGE EXTRACTION
42 : IS DETECTION FLAG ON ?
43 : INDICATOR ON
44 : IS INTER-VEHICLE DISTANCE NEAR DISTANCE LIMIT OR ABOVE ?
45 : IS INTER-VEHICLE DISTANCE FAR DISTANCE LIMIT OR LESS ?
46 : IS ACTUAL VEHICLE SPEED HIGHER SPEED LIMIT OR LESS ?
47 : IS BRAKE SWITCH ON ?
58 : SET ALARM-3
59 : SET "INTER-VEHICLE DISTANCE" BY TIMER-2
64 : SET ALARM-1
65 : SET "INTER-VEHICLE DISTANCE" BY TIMER-2
66 : SET ALARM-1

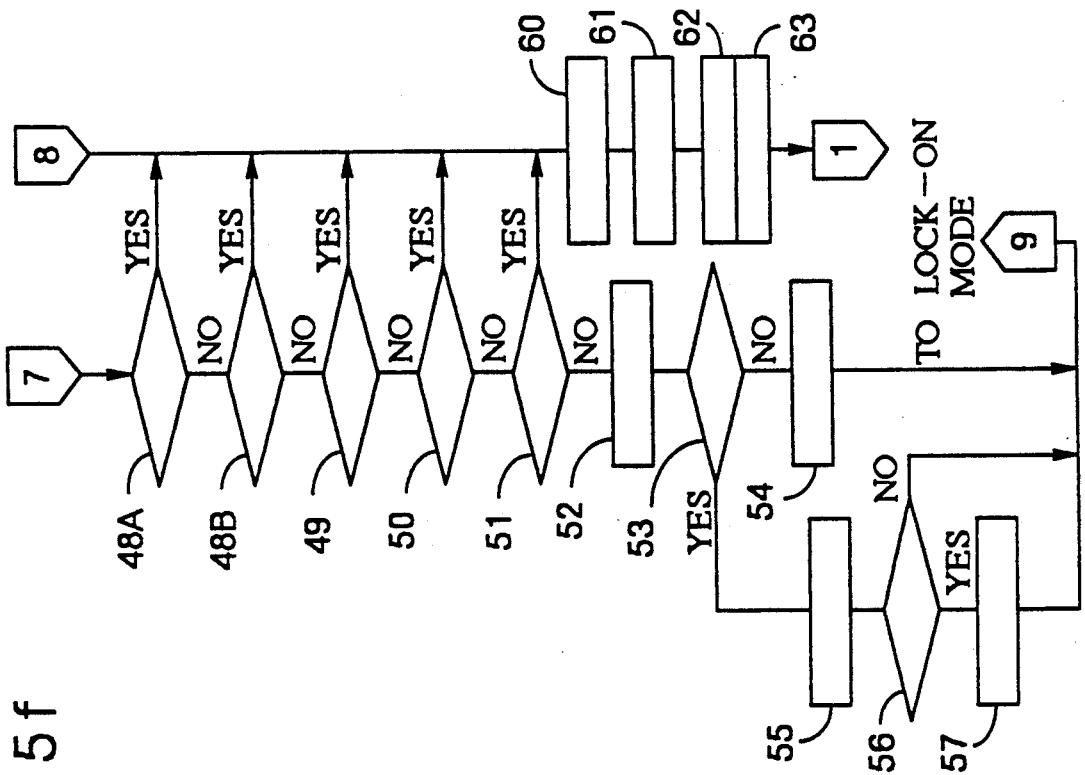

FIG. 5f

48A : IS SWITCH SW8 OR SW9 ON ?
48B : IS TURN FLAG ON ?
49 : IS SWITCH SW4 ON ?
50 : DOES ADVANCING VEHICLE CHANGE ITS LANE ?
51 : IS THERE INTERRUPTION OF THE THIRD VEHICLE ?
52 : CALCULATION OF TARGET SPEED RELATIVE TO CURRENT ONE
53 : TARGET DISTANCE ≧ CURRENT DISTANCE ?
54 : A. D. INCREASE SPEED CONTROL
55 : A. D. DECREASE SPEED CONTROL
56 : Dak < D ?
57 : A. D. SHIFT DOWN CONTROL
60 : SET ALARM-1
61 : SET "INTER-VEHICLE DISTANCE" BY TIMER-2
62 : INTERRUPTION VEHICLE FLAG OFF
63 : ADVANCING VEHICLE LANE CHANGE FLAG OFF 67-95 : CONSTANT SPEED CRUISING MODE
67 : FLICKER "CONSTANT SPEED CRUISING MODE"
68 : IS SWITCH SW1 ON ?
69 : IS SWITCH SW4 ON ?
70 : IS SWITCH SW3 ON ?
71 : IS VEHICLE SPEED HIGHER SPEED LIMIT OR LESS ?
72 : IS VEHICLE SPEED LOWER SPEED LIMIT OR ABOVE ?
73 : IMAGE EXTRACTION
74 : IS DETECTION FLAG ON ?
75 : APPEAR INDICATOR
91 : DISAPPEAR INDICATOR
92 : SET ALARM-3
93 : SET "CONSTANT SPEED CRUISING" BY TIMER-2
94 : SET ALARM-1
95 : SET ALARM-1

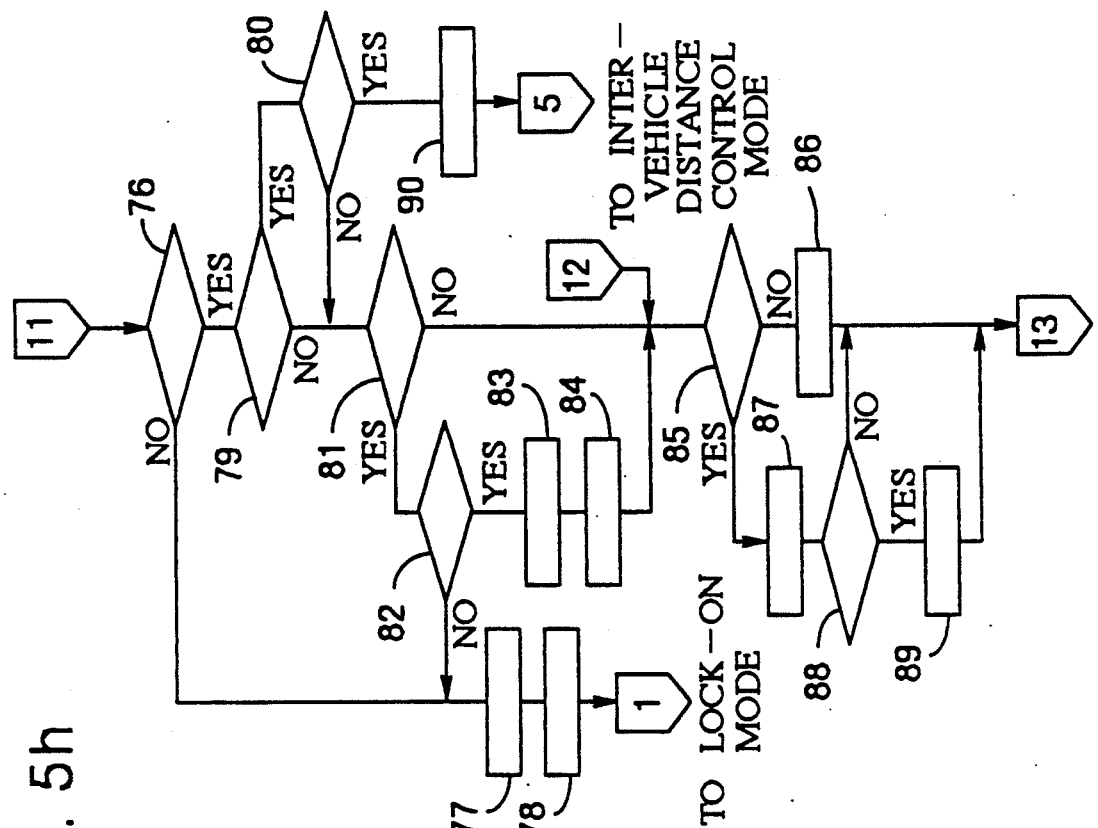

FIG. 5h

76 : IS INTER-VEHICLE NEAR DISTANCE LIMIT OR ABOVE?
77 : SET ALARM-3
78 : SET "CONSTANT SPEED CRUISING" BY INDICATION TIMER-2
79 : IS INTER-VEHICLE FAR DISTANCE LIMIT OR LESS?
80 : SWITCH SW7 ON
81 : D < DTH1?
82 : D < DTH2?
83 : SET D AND ALARM-2
84 : SET "ADVANCING VEHICLE" AND INDICATOR BY TIMER-1
85 : CURRENT SPEED REFERENCE SPEED?
86 : A.D. SPEED INCREASE COTROL
87 : A.D. SPEED DECREASE CONTROL
88 : D < DBK?
89 : A.T. SHIFT DOWN CONTROL
90 : SET ALARM-1

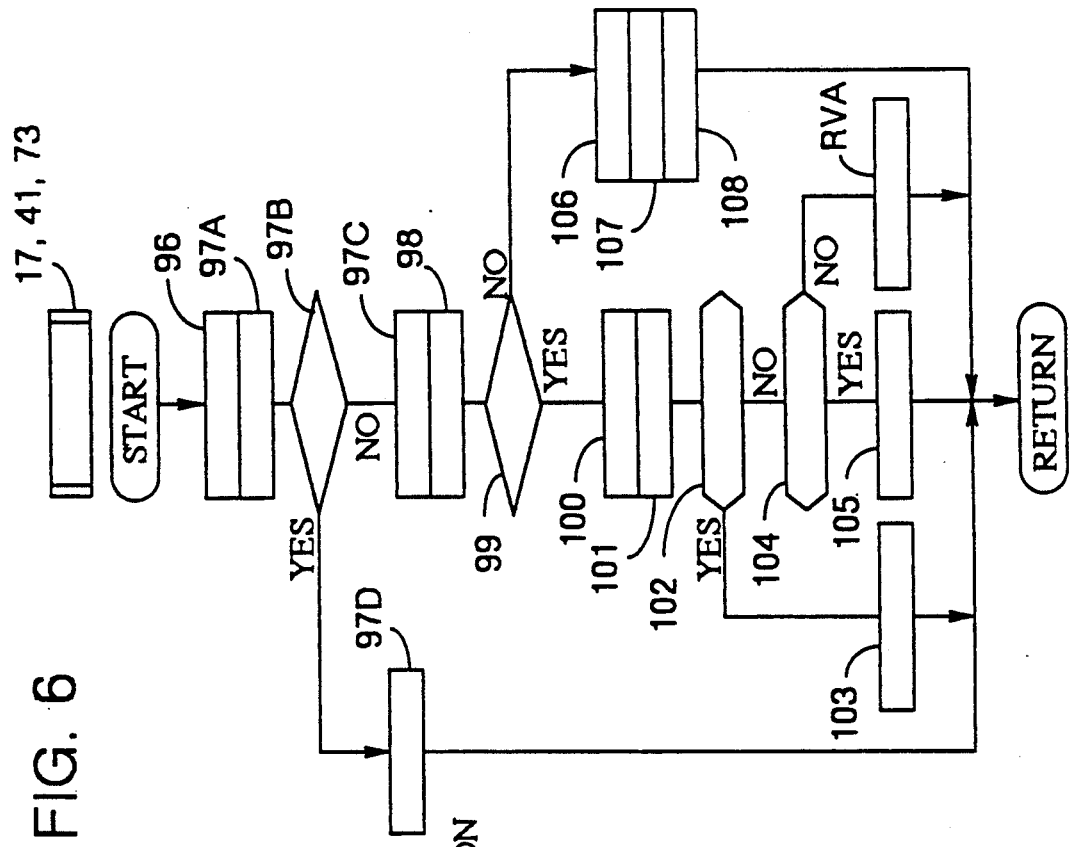

FIG. 6

17, 41, 73 : IMAGE EXTRACTION
96 : IMAGE INPUT
97A : LANE EXTRACTION
97B : DOES THE VEHICLE TRAVERSE THE DIVIDING LINE ?
97C : TURN FLAG OFF
97D : TURN FLAG ON
98 : ADVANCING VEHICLE EXTRACTION
99 : IS THERE AN ADVANCING VEHICLE ON LANE OF THE VEHICLE ?
100 : DISTANCE MEASUREMENT
101 : ADVANCING VEHICLE DETECTION FLAG ON
102 : NEW DISTANCE−LAST DISTANCE ≧ di ?
103 : ADVANCING VEHICLE LANE CHANGE FLAG ON
104 : LAST DISTANCE−NEW DISTANCE ≧ di ?
105 : INTERRUPTION VEHICLE FLAG ON
RVA : CALCULATION OF THE RELATIVE SPEED vr
106 : ADVANCING VEHICLE DETECTION FLAG OFF
107 : INTERRUPTION VEHICLE FLAG OFF
108 : ADVANCING VEHICLE LANE CHANGE FLAG OFF

TIP : TIMER INTERRUPTION PROCEDURE
109 : ALARM—1 ?
110 : ALARM—2 ?
111 : ALARM—3 ?
112 : PROCESS OF ALARM—1
113 : PROCESS OF ALARM—2
114 : PROCESS OF ALARM—3
115 : INDICATION TIMER—1 ?
116 : SET DATA OF INDICATION TIMER—1
117 : DTH1 <D ?
118 : DK1 <D ?
119 : DK2 <D ?
120 : DK3 <D ?
121 : SET LOUDNESS AT 1
122 : SET LOUDNESS AT 2
123 : SET LOUDNESS AT 3
124 : SET LOUDNESS AT 4
125 : INDICATION TIMER—2 ?
126 : SET DATA OF INDICATION TIMER—2

FIG. 8

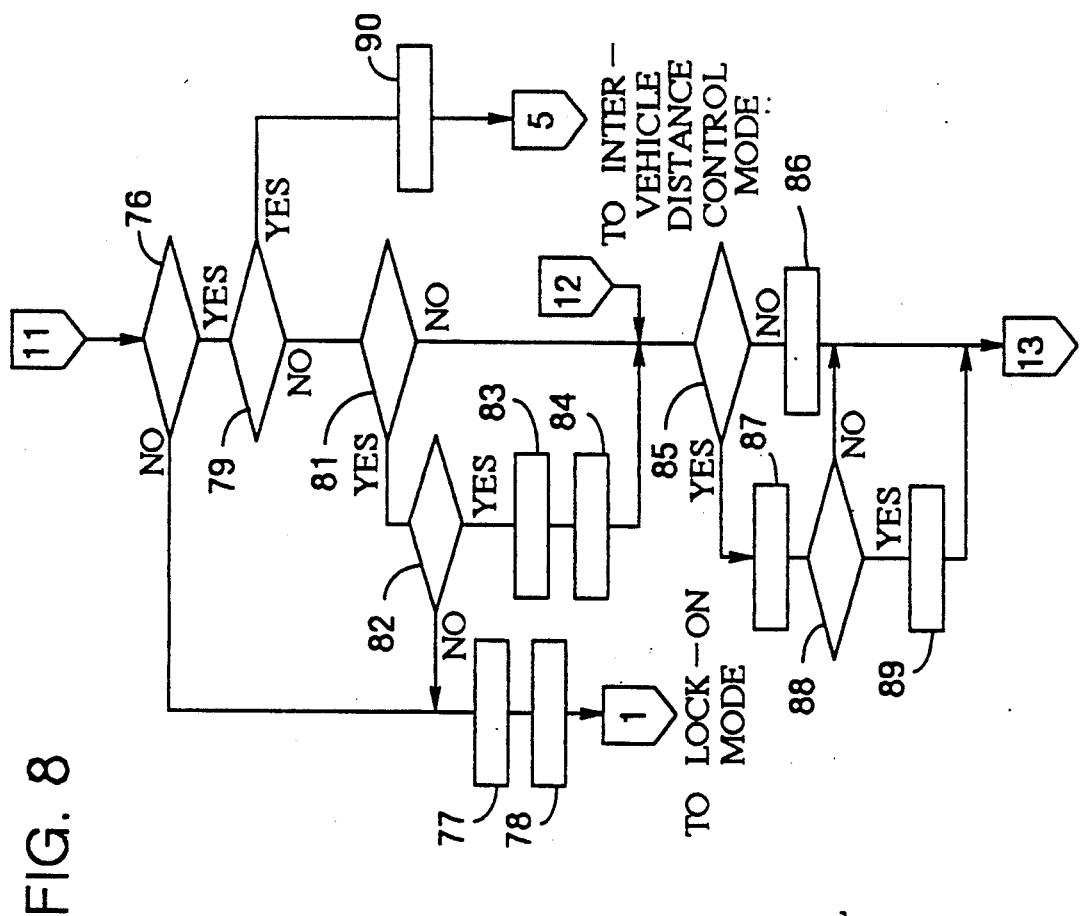

76 : IS INTER-VEHICLE DISTANCE NEAR DISTANCE LIMIT OR ABOVE ?
77 : SET ALARM-3
78 : SET "CONSTANT SPEED CRUISING" BY TIMER-2
79 : IS INTER-VEHICLE DISTANCE FAR DISTANCE LIMIT OR LESS ?
81 : IS D GREATER THAN DTH1 ?
82 : IS D LESS THAN DTH2 ?
83 : SET D AND ALARM-2
84 : SET "ADVANCING VEHICLE" AND INDICATOR BY TIMER-1
85 : IS ACTUAL SPEED REFERENCE SPEED OR ABOVE ?
86 : A. D. INCREASING SPEED CONTROL
87 : A. D. DECREASING SPEED CONTROL
88 : IS D LESS THAN DBK ?
89 : A. T. SHIFT-DOWN CONTROL
90 : SET ALARM-1

VEHICLE CRUISING CONTROL DEVICE

BACKGROUND OF THE INVENTION

1. Field of the Invention

The present invention relates to a vehicle cruising control device and in particular to a vehicle cruising control device which can keep the inter-vehicle distance between two vehicles and/or the vehicle speed at a constant value.

2. Description of the Related Art

Japanese Patent Laid-open Print No. Sho 62(1987)-153531, which was published without examination, discloses a conventional vehicle cruising control system for maintaining the vehicle speed at a constant value which is variable according to the driver's desire. The cruising of the vehicle at a high speed may be dangerous when the road becomes congested, thereby compelling the cancellation of the constant cruising function.

However, since this cancellation should be manually, in the event of a delayed cancellation, the vehicle may strike the rear of the advance vehicle.

SUMMARY OF THE INVENTION

It is, therefore, a primary object of the present invention to provide a vehicle cruising control device which can at once cancel the constant speed cruising function automatically when the vehicle comes near the advance vehicle and establish the sufficient inter-vehicle distance between the vehicles.

In order to accomplish the object, a vehicle cruising control device is comprised of detecting means for detecting the current speed of the vehicle, constant speed control means for maintaining the speed of the vehicle by checking the current speed at a value, measuring means for measuring the current inter-vehicle distance between the vehicle and an advance vehicle at a value, inter-vehicle distance control means for maintaining the inter-vehicle distance between the vehicle and the advance vehicle by checking the current inter-vehicle distance at a value and switching means for turning on either of the constant speed control means and the inter-vehicle distance control means.

BRIEF DESCRIPTION OF THE DRAWINGS

The above and other objects, features and advantages of the present invention will become more apparent and more readily appreciated from the following detailed description of preferred exemplary embodiments of the present invention, taken in connection with the accompanying drawings, in which:

FIG. 1e is a block-diagram of a constant speed cruising control device shown in FIG. 1a;

FIG. 2a is a view showing the relationship among control modes;

FIG. 2b is a table in which are shown a transfer from a specific mode to another mode and the relating matters thereto;

FIG. 3b is a view showing an operating mode of each buzzer;

FIG. 3c is a view showing time charts;

FIGS. 5a through 5h are flow charts showing operations of a micro-processor CPU3;

FIG. 6 shows outlines of photographing and calculating operations of a micro-processor CPU2;

FIG. 8 is a modification of FIG. 1e.

DETAILED DESCRIPTION OF THE PREFERRED EMBODIMENTS

Figure 1A:
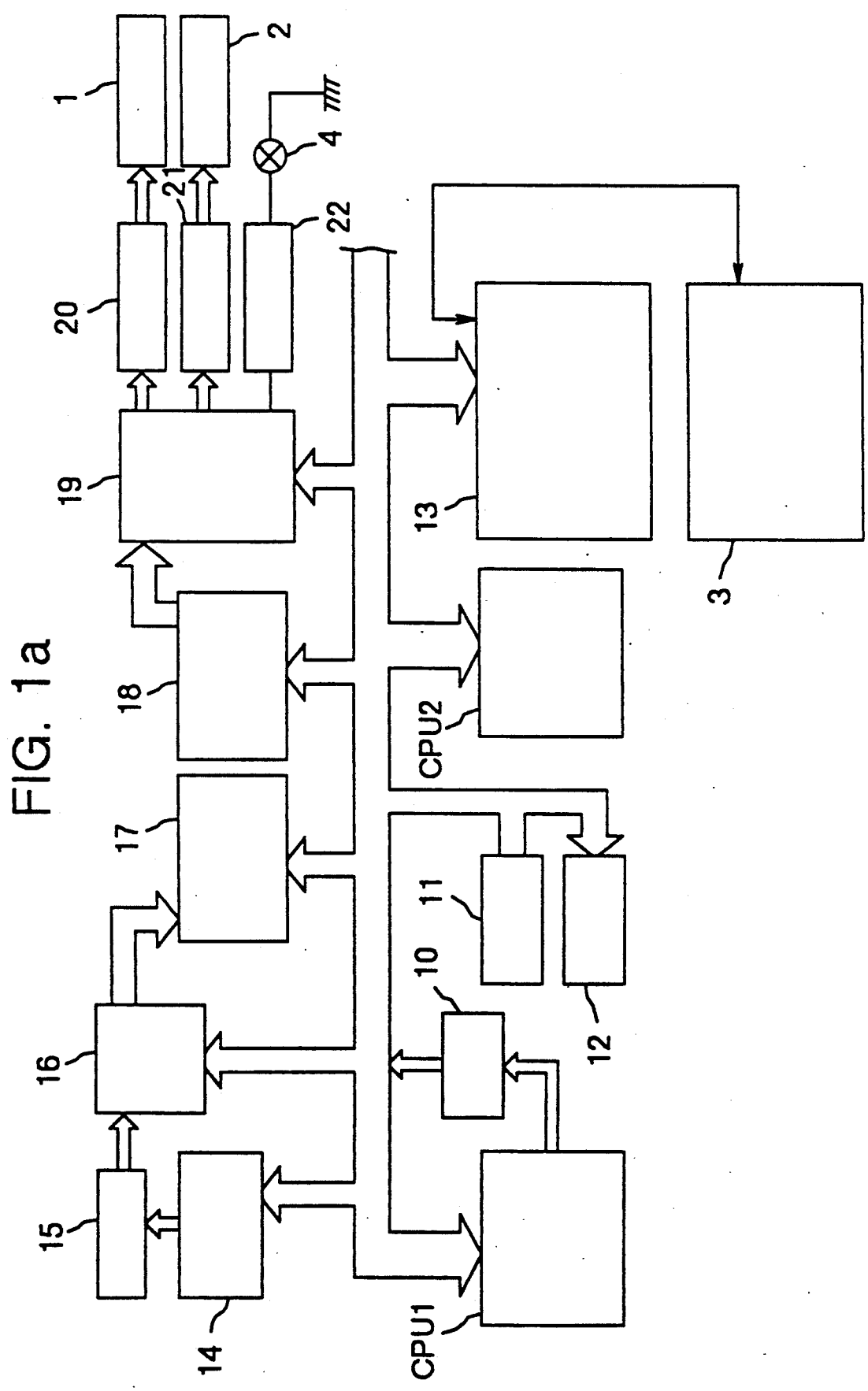
FIG. 1a is a block-diagram of a vehicle speed control system according to one embodiment of the present invention.

Referring first to FIG. 1a, there is illustrated an overall construction of a vehicle speed control system in accordance with one embodiment of the present invention. This system is designed to be mounted on a first or reference vehicle which is driven by an engine in order to control a speed thereof based on an inter-vehicle distance between the first vehicle being monitored and an advance or a second vehicle. In this system, an image in the advancing direction or toward the second vehicle from the first vehicle is caught by a video camera and is processed by both a micro-processor CPU1 and a micro-processor CPU2, thereby detecting a lane of the first vehicle and the second vehicle and calculating an inter-vehicle distance between the first and second vehicles and a speed of the first vehicle relative to the second vehicle. Then, the image is displayed in the simplicated form on a screen of a display CRT1 for enabling a driver's recognition of the condition in the advancing direction and the micro-processor CPU3 of a constant speed cruise control device begins to control a throttle valve of the engine in order to adjust the current speed of the first vehicle to its target speed on a display 2 which is obtained or calculated based on a correlation between the inter-vehicle distance and the relative speed of the first vehicle to the second vehicle. If the closure of the throttle valve brings an insufficient speed reduction, further speed reduction is established by an engine-brake as a result of a shift down operation of an automatic transmission 3.

Figure 1B:
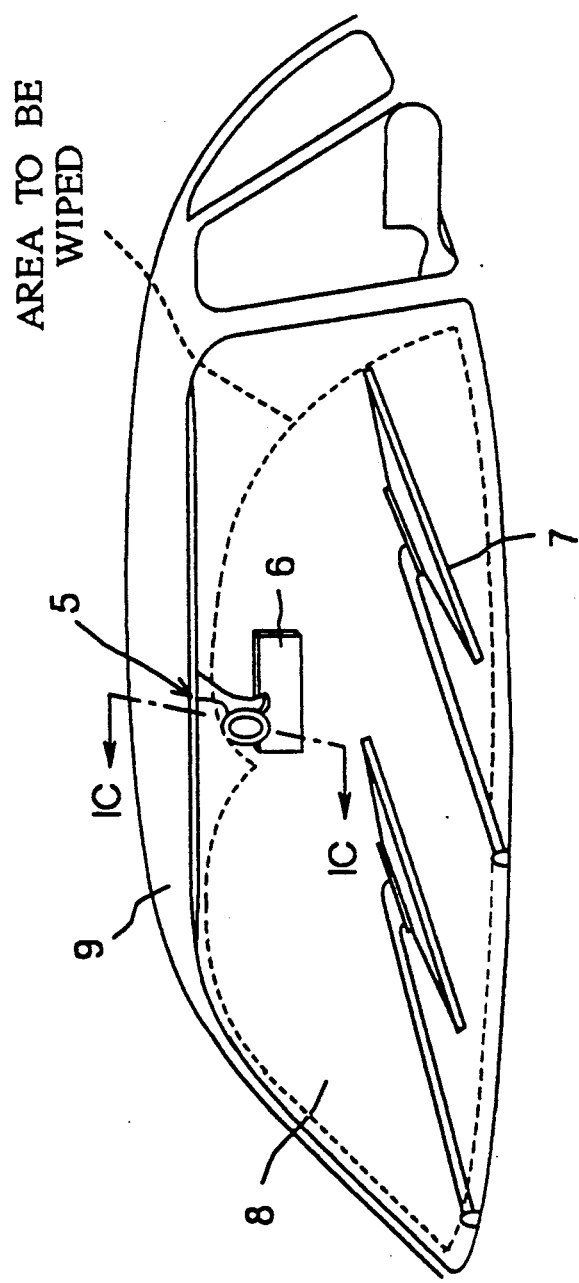
FIG. 1b is a perspective view of a front window glass of a vehicle on which a vehicle control system is mounted.
Figure 1C:
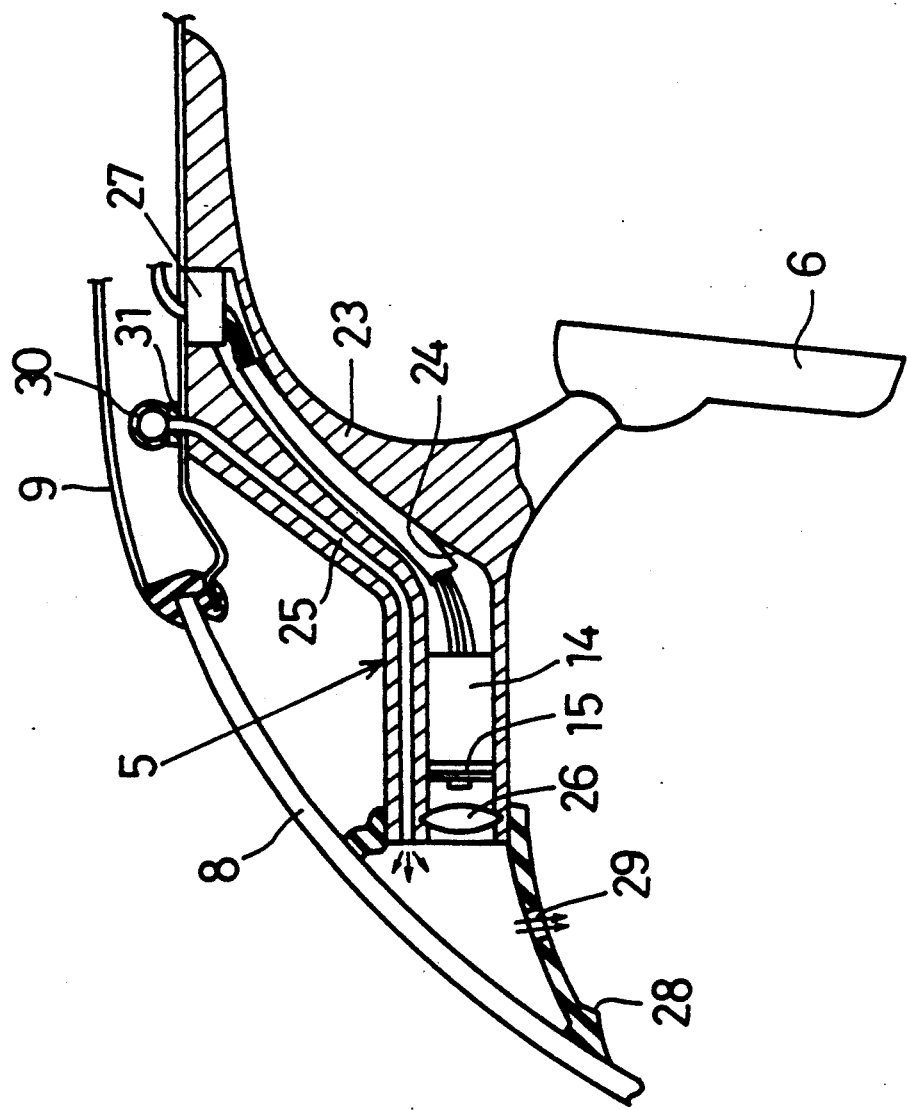
FIG. 1c is an enlarged cross-sectional view taken along line IC—IC in FIG. 1b.

The video camera 15, for taking a photograph of a scene in the advancing direction of the first vehicle, is installed within an inner space of the first vehicle at a position adjacent the upper central portion of a front window glass 8. In FIGS. 1b and 1c, it is disclosed how the video camera 15 is installed to the first vehicle. The video camera 15 is mounted in a supporting arm 5 of an inside mirror 6. The arm 5 is formed into a substantial "Y" shaped configuration and has a base portion and a branch portion which is directed in the vehicle frontward direction. In both portions, there are formed a passage 24 through which a cable of the video camera 15 extends and a passage 25 acting as an air passage. Another branch portion of the supprting arm 5 which is oriented toward vehicle rearward direction is provided for securing the mirror 6. At a frontward side in the passage 24, a lens 26, the video camera 15 and a video camera controller 14 are arranged and the controller 14 is electrically connected to a connector 27.

An upper end portion of the air passage 25 is connected via a connector 31 to an air pipe 30 which is in fluid communication with an air conditioner (not shown) and the other end portion of the passage 25 which is opened toward the window glass 8. A small diameter portion of a rubber hood 28 is elastically mounted on the branched portion where it encloses the lense 26 and a large diameter portion of the hood 28 is secured on an inner surface of the window glass 8. This hood 28 brings an optical path between the lens 26 and the inner surface of the window glass 8 in the closed condition. An aperture 29 is provided in the hood 28 at its lower portion for discharging air blown into the hood 28 toward the inner space of the vehicle. This structure is for eliminating the humidity by which an outer surface of the lense 24 and the inner surface of the window shield 8 will become cloudy. It should be noted that due to the elasticity of the hood the transmission of the vibration between the supporting arm 5 and the window shield 8 in prevented. For the clear photography of the forward scenes of the first vehicle by the camera 14, a wiper device 7 is used by which dirt and/or water drops on the outer surface of the window shield 8 are removed.

Referring back to FIG. 1a, the video camera 15 is in the form of a two-dimension image sensor and its outputted picture signal is converted by an A/D converter 16 for each picture element into digital data representive of one of 256 graduation levels. The resulting signal is stored or written in an image memory 17 with 512×512 picture elements per frame. The processor CPU1 is provided for controlling the aperture of the lense 26 and the outputted picture signal from the video camera 15 via the controller 14 and is also provided for the synchronous control of the writing of data into the image memory 17 and the input and output of the A/D converter 16.

The CPU2 is used for processing picture signals in the image memory 17 and writing the resulting data into an output buffer memory 18 in which picture signals for one frame are to be displayed. A display controller 19 is electrically connected with a CRT driver 20 for driving a color display CRT1, an indicator driver 21 for driving the character display 2 on which the vehicle speed is shown and a buzzer driver 22 for driving a buzzer 4.

Figure 3A:
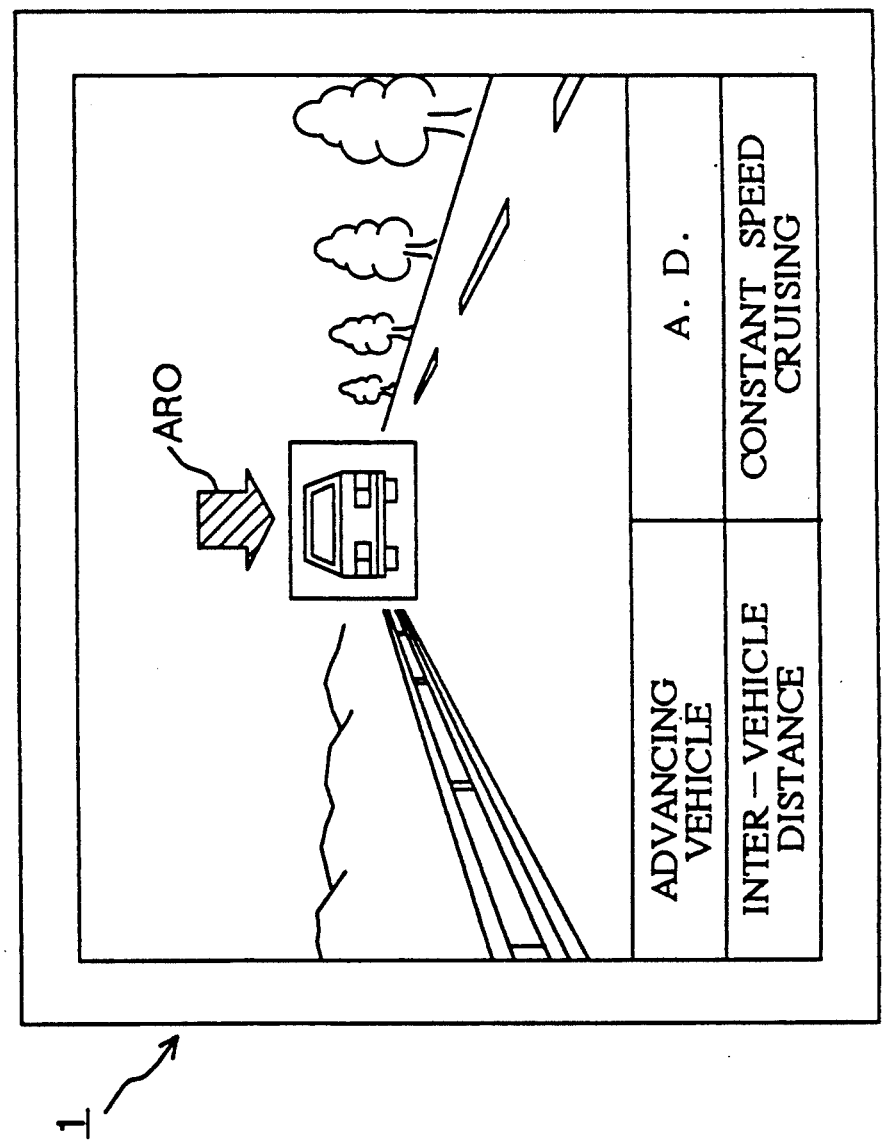
FIG. 3a is an enlarged view of a display CRT1 on which an image is displayed.

The processor CPU2 is designed to process the picture image or image signal stored in the image memory 17 for extracting the both sides of a lane, extracting the advancing vehicle on the lane, calculating the inter-vehicle distance between the reference vehicle and the advance vehicle, calculating the relative speed therebetween and calculating other related variables, thereby displaying the results on the display CRT1 as shown in FIG. 3a. This image processing and each calculation are detailed in Japanese Patent Laid-open Print No. Sho 64(1989)-66712. It should be noted that the advancing or forward scene and the indicator ADR for indicating the advance vehicle are shown on the display CRT1 with different colors. At the lower side portion of the display CRT1, there are four sections each of which is provided for displaying character information or phrase information which is provided by the processor CPU3 of the constant speed cruising device 13. The processor CPU2 is designed to activate the display 2 and the buzzer 4 after receipt of information to be displayed and order for driving the buzzer 4 from the processor CPU2.

Figure 1D:
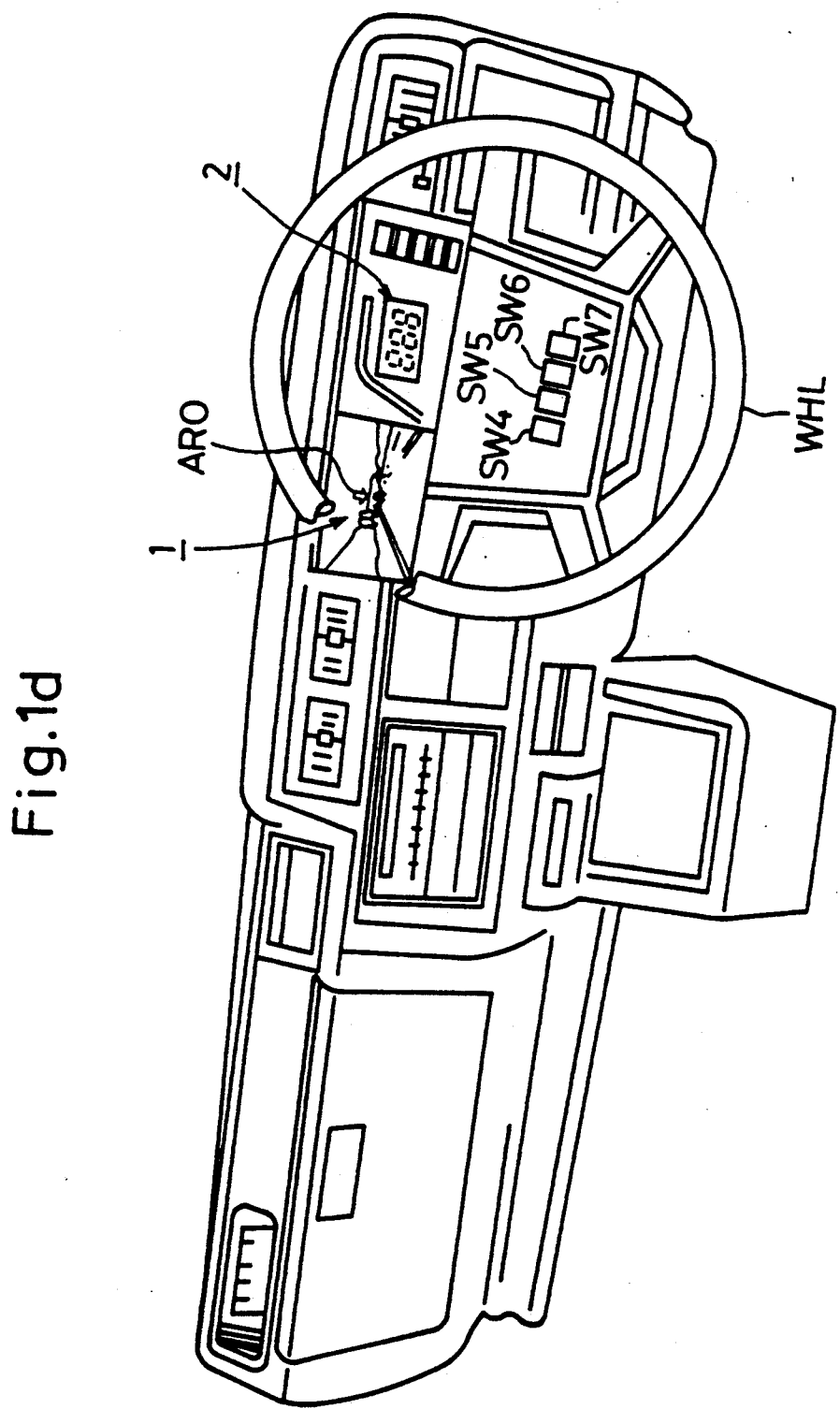
FIG. 1d is a perspective view of an instrument panel of a vehicle shown in FIG. 1b.

In FIG. 1d, there is illustrated an overview of an instrument panel which is located in front of the driver. The displays CRT1 and 2 are embedded in the instrument panel.

Referring now back to FIG. 1a, in a read only memory ROM 11 and a random access memory RAM 12, there are stored the control program and parameters under processing respectively. A controller 10 is provided for controlling the data transfer between two elements, the address transfer and similar data processing.

Figure 1E:
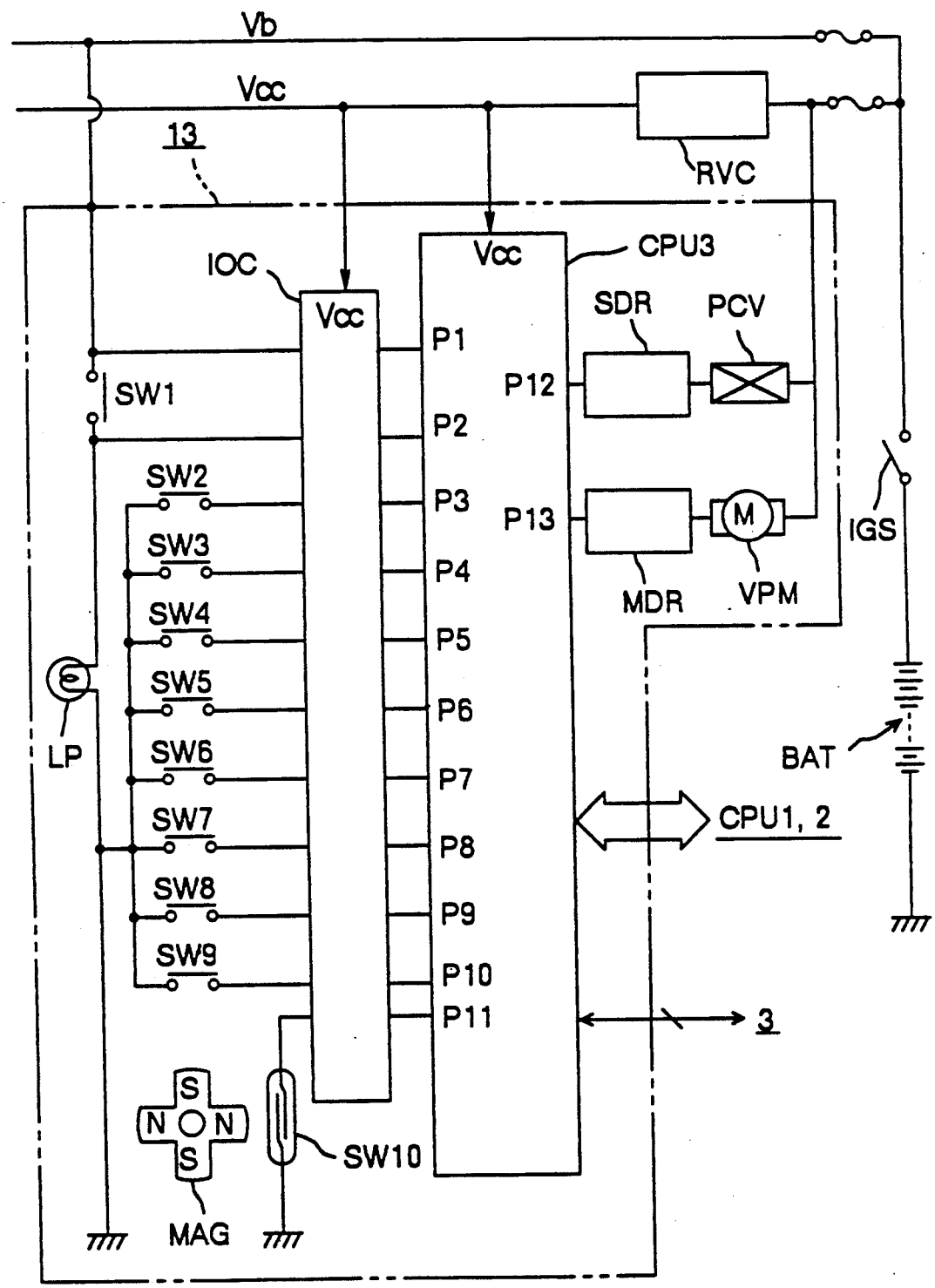

In FIG. 1e, there is shown a structure of the constant speed cruising device 12 which is in the form of a block-diagram. The processor CPU3 which is regarded as the heart or this device 12 has input ports P1 through p11 to which are connected switches IGS and SW1 through SW10 respectively via an interface circuit IOC. The processor CPU3 has also input ports P12 and P13 to which are connected a solenoid driver SDR and a motor driver MDR respectively.

The following each is a description as to the purpose of each of the foregoing switches.

(1) The switch IGS is at once an ignition switch and a main switch of the device 13.
(2) The switch SW1 is a brake switch to be closed during depression of the brake pedal.
(3) The switch SW2 is one to be operated in relation the operation of a clutch pedal.
(4) The switch SW3 is one to be closed when the acceleration pedal is depressed excessively above the idling opening.
(5) The switch SW4 is one to be used for cancelling the constant speed cruising mode.
(6) The switch SW5 is a resume switch to be used upon re-start o returning to the constant speed cruising mode.
(7) The switch SW6 is one to be used upon indication or initiation of the constant speed cruising mode.
(8) The switch SW7 is one to be used upon indication or initiation of the inter-vehicle distance control mode.
(9) The switch SW8 is used for indicating the turning of the vehicle in the rightward direction.
(10) The switch SW9 is used for indicating the turning of the vehicle in the leftward direction.
(11) The switch SW10 is a speed sensor in the form of the reed switch type for detecting the vehicle speed.

The switches SW4 through SW7 are so located at a central portion of a steering wheel WHL as not to be rotated together therewith. The reason is that the switches are secured to a hollow shaft which is served for supporting rotatably the steering wheel WHL.

In the neighborhood of the switch SW10 which is in the form of the magnetic responsive reed switch, there are provided four permanent magnet MAG secured on an axle to be rotated together therewith. The character LP shows a stop lamp.

One end of the switch SW1 whose the other end is connected to the plus terminal of an on-vehicle battery BAT is grounded via the stop lamp LP. The switch SW1 is interposed between the input ports P1 and P2 of the processor CPU3 via the interface circuit IOC. If the switch SW1 is turned on, under normal condition, the level at the port P2 is changed from 'L' (low level) to 'H' (high level) without the change of the level at the port P1. However, under abnormal condition such as the melting of the fuse connected to the battery BAT, the level at the port P2 is not changed and the level at the port P1 is changed from 'H' to 'L'.

One end of each of switches SW2 through SW10 is grounded. That is to say, if each switch is turned on, the level of the corresponding port thereto is changed to 'L'. The port 11 is an external interruption input port. The processor CPU3 is designed to execute the external interruption procedure at each time when the level of the port 11 is changed from 'H' to 'L' for detecting the periodic between on-off conditions of the switch SW10 which is used for calculating the vehicle speed to be stored in the vehicle speed register.

In the neighbourhood of an engine (not shown) mounted on the vehicle, a vacuum pump (not shown) and an actuator which comprises a solenoid valve PCV for changing the air passage and a diaphragm are provided for controlling the operation of a throttle valve. The vacuum pump has a motor VPM so as to develop the negative pressure at its outlet port upon excitation of the motor. When the solenoid valve PCV is activated, an inlet port of the diaphragm is set to be brought into fluid communication with the outlet port of the vacuum pump. While the solenoid valve PCV is not being activated, the inlet port of the diaphragm is exposed to the atmospheric pressure. The processor CPU3 increases the negative pressure in the diaphragm chamber by activating the motor VPM and the solenoid valve PCV, when the throttle opening is increased for increasing the vehicle speed. If the throttle valve opening is determined to be kept at a constant degree for maintaining the vehicle speed at a constant value, the processor CPU3 turns the motor VPM off and continues to activate the solenoid valve PCV. When the throttle valve opening is desired to be decreased for decreasing the vehicle speed, the motor VPM and the solenoid valve PCV are turned off for introducing the atmospheric pressure into the diaphragm chamber. Based on the order from the processor CPU3, the solenoid driver SDR (motor driver MDR) is designed to control the solenoid valve PCV (the motor VPM). The foregoing acuator is detailed in Japanese patent Laid-open Print No. Sho 62(1987)-153531.

The processor CPU3 of the constant speed cruising device 12 is designed for controlling or operating mainly four control modes- the waiting mode, lock-on mode, the inter-vehicle distance control mode and the constant speed cruising mode.

The relationship among these modes, especially the transfer from a specific mode to another mode, is shown in the form of the block-diagram and chart in FIG. 2a and FIG. 2b respectively. FIG. 2b also shows which object is shown on the display CRT1 and the buzzer alarm function upon transfer from a specific mode to another mode. FIG. 3b shows the timing of each of buzzer alarm timers and FIG. 3b shows the timing of each of the indication timers. The operation of the processor CPU3 is detailed on the form of the flow charts as illustrated in FIGS. 5a through 7.

Hereinafter, operation modes as mentioned above will be described in detail with reference to FIGS. 5a through 7.

Figure 5A:
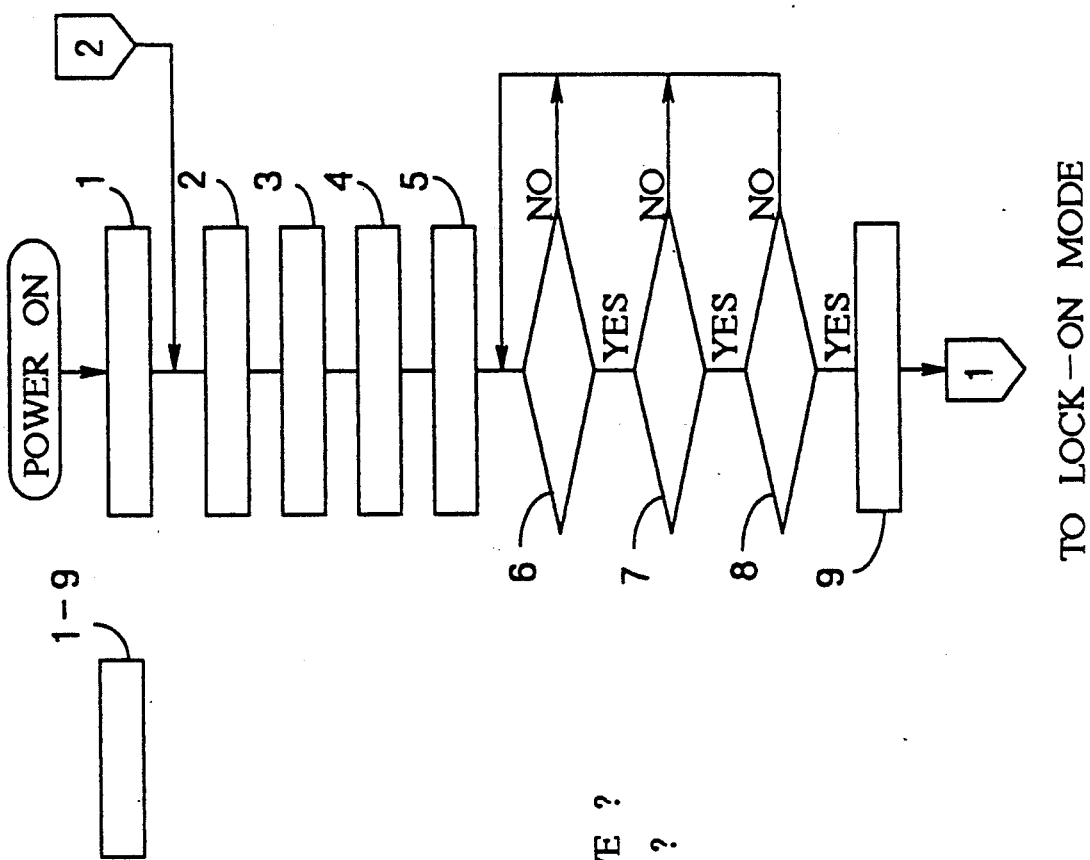

(I) Waiting mode (FIG. 5a)

When each portion of the voltage regulator RVC is applied with set voltage immediately after closure of the ignition-key switch or the engine-key switch IGS, the CPU3 is turned on or activated, thereby intializing its input/output port, inner memory, counters, registers and other related elements (Step 1). Then, the CPU3 outputs a signal, which is similar to a signal indicating the cancellation of an automatic driving control, to the solenoid driver SDR and the motor driver MDR. Thus, no throttle valve operation for the opening thereof is established resulting in that the vehicle travel depends only on the accelerator operation. No object is appears on the display CRT1. The processor CPU3 waits the time when the condition is established under which the vehicle speed is the lower speed limit or above, the vehicle speed is the upper speed limit or less and the switch SW is being closed (Steps 2 through 8).

Upon establishement of the foregoing condition in the step 8, the alarm-1 is set (step 9) and the control is transferred to the Lock-on mode. As shown in FIG. 3b, the alarm-1 activates once the buzzer 4 for a short time. The setting of the alarm-1 initiates the buzzer activation timer, orders the processor CPU2 the initiation of the buzzer activation and permits the timer interruption. In response to the signal for starting the activation of the buzzer 4, the CPU1 outputs the alarm driver 22 the signal for the indication of the turning-on. Thereafter, the processor CPU3 executes the timer interruption routine TIP and orders the CPU1 to stop the buzzer 4.

Figure 5B:
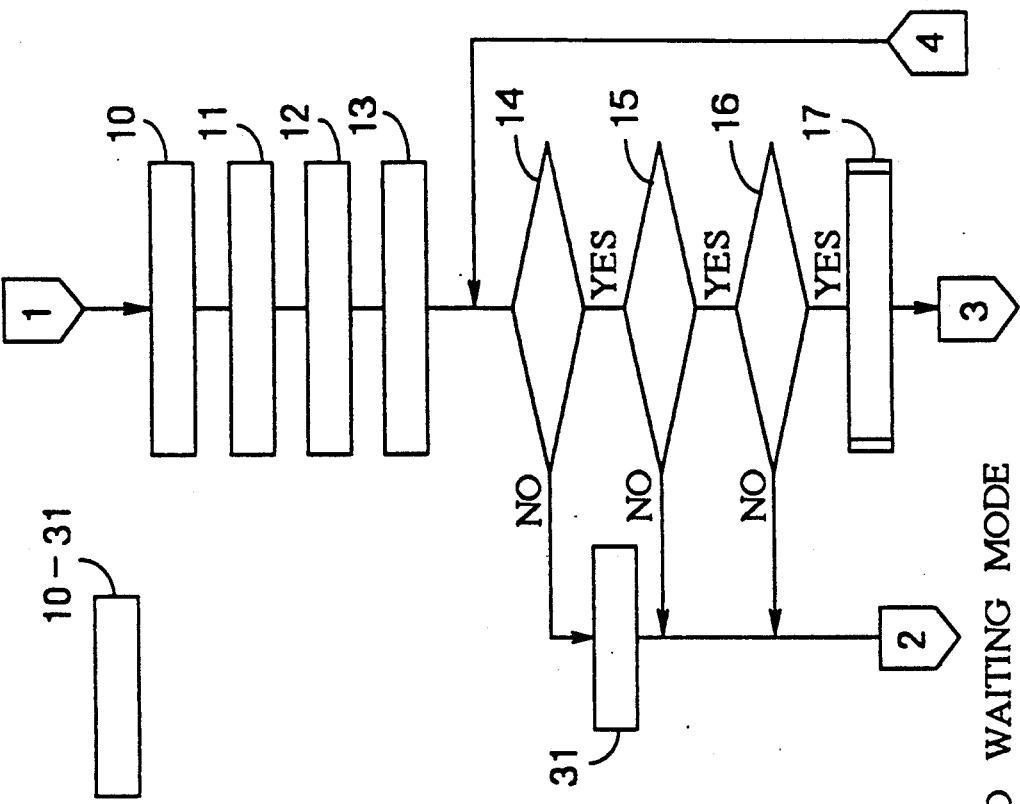

(II) Lock-on mode (FIGS. 5b and 5c)

Under this mode, operating condition of the system is indicated. That is to say, on the display CRT1 only "A.D," is appeared and alarm instruction information with respect to the alarms-1,-2 and/or -3 disappears (steps 10 through 12).

In light of the transfer to the Lock-on mode from the Inter-vehicle distance control mode or the Constant speed cruising mode, the auto speed control is cancelled by releasing the actuator wherein PCV and VPM are turned off (step 13). Thus, throttle valve operation becomes under the control of the driver's acceleration operation. This means that the vehicle travel can be established only by the driver's acceleration operation.

After comparing the current speed of the vehicle with the lower speed limit and the upper speed limit (steps 15 and 16), the processor CPU3 orders the CPU2 to the establishment of the image processing when the current or actual vehicle speed is between the lower and upper limits. The processor CPU2, after its image processing, displays the simple and clear views of the forward scenes of the vehicle on the display CRT1 and provides the CPU3 the calculated inter-vehicle distance, relative speed between the vehicles and the cruising information as to whether the vehicle traverses a dividing line between two lanes or not (step 17). Detailed contents in step 17 is shown in FIG. 6. On display CRT1, there appears the forward scenes of the vehicle, an indicator, ARO for aiding or enabling an easy detection of the advance vehicle if existing and characters "A.D.". If advance vehicle is not within the far distance limit, the indicator ARO does not appear on the CRT1. When the advancing vehicle is detected to be shown on CRT1, the indication timer 1 and the alarm 2 are set in turn (steps 18 through 22). Thus, the indicator ARO and the character "Advance Vehicle" are flashed on and off repeatedly according to the mode of the indication timer 1 as shown in FIG. 3c, and the buzzer 4 is being activated intermittently to sound according to the periodic mode shown in FIG. 3c.

If the vehicle speed is the lower speed limit or less, the vehicle speed is the upper speed limit or above, or the switch SW3 is closed, the control is returned to the Waiting mode. In the last case, the alarm 1 is set (steps 14 through 16 and 31).

Under the Lock-on mode, when the inter-vehicle distance is near distance limit or above and is far distance limit or less, the CPU3 waits for the closure of the switch SW6 or the switch SW7 (steps 14 through 24).

Each switch 4/5/6/7 is so designed as to be brought into the closed condition only while it is being pressed. If the automatic inter-vehicle distance control is desired by the driver, he/she can realize his/her desire only by pressing the switch SW7 when the desired inter-vehicle is established. Similarly, the automatic control cruising mode is established only by pressing the switch SW6.

Upon closure of the switch SW7, the CPU3 sets the alarm 1 (step 25), writes the vehicle speed and the inter-vehicle distance at this time into the reference speed register and the reference distance register, respectively (steps 26 and 27), and transfers its control to the inter-vehicle distance control mode.

IF the switch SW6 is brought into the closed condition, The CPU3 sets the alarm 1, writes the vehicle speed at this time into the reference speed register (step 29), and transfers its control to the constant speed cruising mode.

(III) Inter-vehicle distance mode (FIGS. 5d, 5e and 5f)

The CPU3, first of all, orders the CPU2 to display the "A.D.", "Inter-vehicle distance" and "Advance vehicle" ata lower portion on the display CRT1 and the disappearance of "Constant speed cruising" therefrom, and rests the alarm indication information (steps 32 through 34 in FIG. 5d) Next, the CPU3 calculates the deceleration $\alpha$ by using data in both of the reference vehicle speed register and the reference distance register.

Figure 4A:
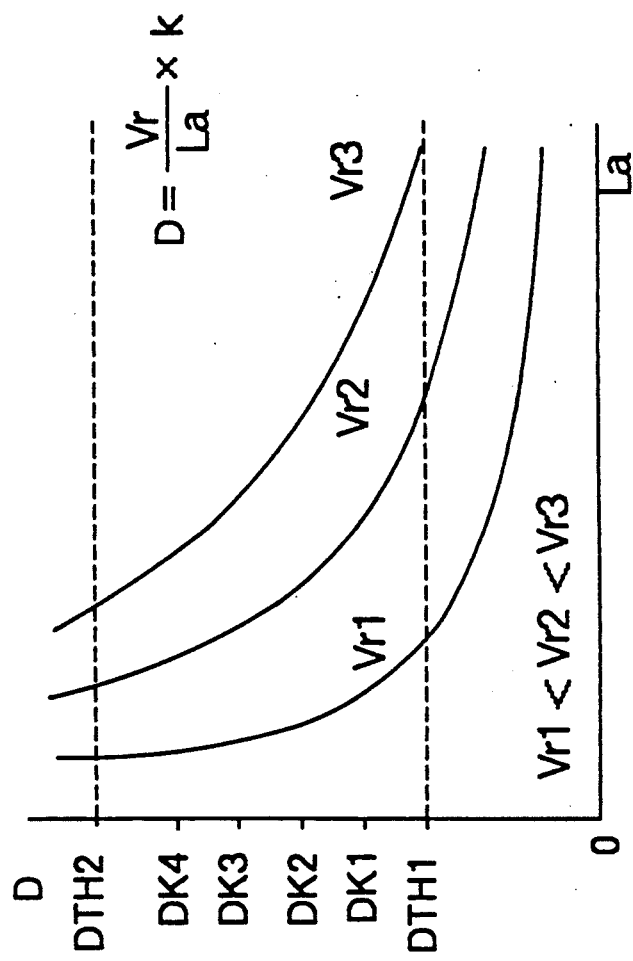
FIG. 4a is a graph of a danger degree D depending on an inter-vehicle length La and a difference speed between a reference vehicle and an advancing vehicle.
Figure 4B:
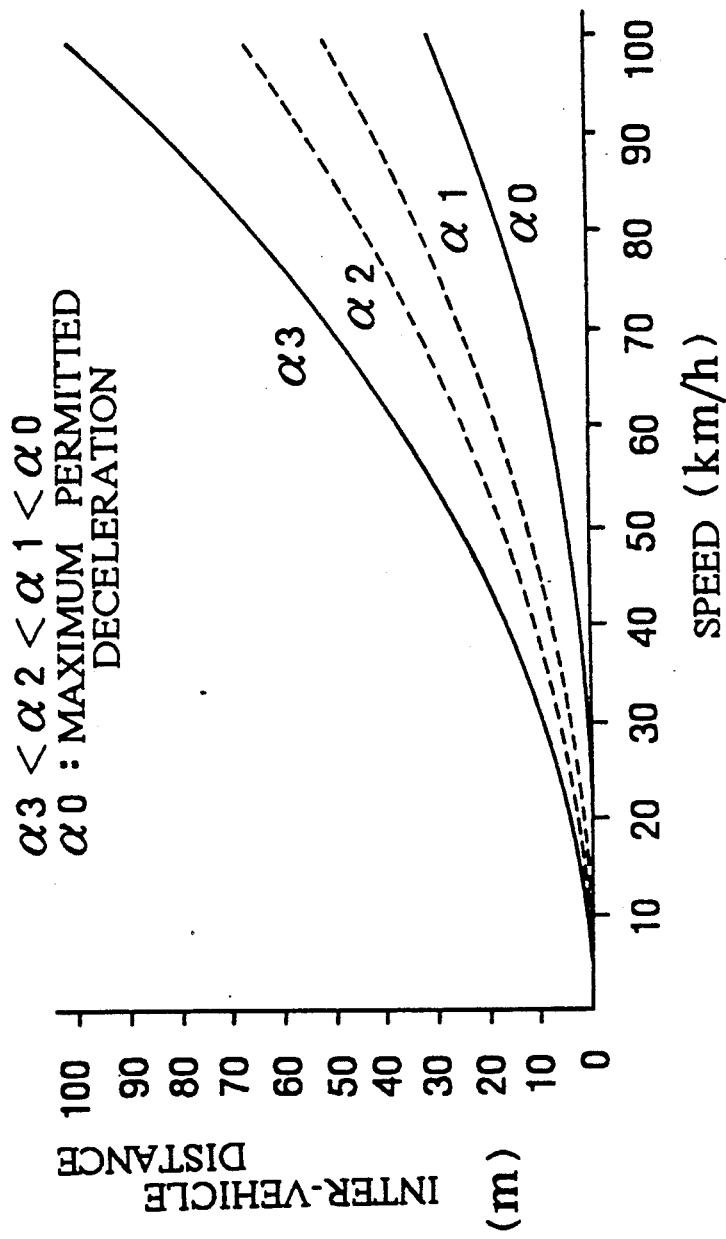
FIG. 4b is a graph showing relationship between a speed of a vehicle and an inter-vehicle distance.

Some examples of the deceleration $\alpha$ are shown in FIG. 4b. The inter-vehicle distance L (m) is determined by the braking distance relative to the vehicle speed V (km/h) and the the deceleration $\alpha$ is defined as $L = V^2/(2\alpha)$. For example, in Japan, assuming that the deceleration $\alpha$ is 0.4 g, the inter-vehicle distance L is set to be 100 m (40 m) when the vehicle speed is 100 km/h (60 km/h). However, on the actual case, the actual inter-vehicle distance L is more or less different from the ideal one as mentioned above in light of the differences in the timing of driver's recognization of the danger, the timing of the depressing of the brake pedal after the recognization of the danger, the time between the brake application, the braking effect and the friction co-efficient of the road, and the advance vehicle's travel condition.

The foregoing tendency of the driver's action, in this embodiment, the data in the reference inter-vehicle register and the reference vehicle speed register are treated, respectively, as the inter-vehicle distance L and the vehicle speed V.

In this case the vehicle speed is constant. Contrary thereto, the advance vehicle increases (decreases) its speed, thereby requiring the increasing (decreasing) of the target inter-vehicle distance between the vehicles. If such change in the speed of the vehicle, occurs the inter-vehicle distance is increased, thereby permitting the interruption of a third vehicle between the vehicles, or the inter-vehicle distance is decreased which will generate the danger of collision. In the former case, the vehicle has to decrease its speed for preventing the collision to the third vehicle.

In light of the foregoings, in this embodiment, the deceleration $\alpha$ is calculated by using equation of $L = V^2/(2\alpha)$ wherein V and L are data in the reference vehicle speed register and the reference inter-vehicle register which are written therein in steps 26 and 27. The resulting deceleration $\alpha$ is, then, compared with the maximum permitted value from the viewpoint of safety. If the deceleration is the maximum permitted value or above, the former is replaced with the latter (step 38).

Thus calculated deceleration $\alpha$ is substituted in the expression of $L = V^2/(2\alpha)$ (step 37 in FIG. 5d). The outline of step 37 is as follows. While the Inter-vehicle control mode is continued, the inter-vehicle distance La is detected repeatedly, the target inter-vehicle distance L is calculated, in light of the continually changing vehicle speed, by using the foregoing expression, and the throttle valve is controlled so as to establish the coincidence of the detected inter-vehicle distance La with the target inter-vehicle distance L. Such determination of the target inter-vehicle distance L enables the automatic establishment of the vehicle speed relative to the inter-vehicle distance characteristics according to the driver's skill and tendency, thereby realizing the inter-vehicle distance control based on each driver's desire. It should be noted that the deceleration $\alpha$ is restricted under the maximum permitted value, thereby preventing the realization of the driving such as the high speed travelling despite a short inter-vehicle distance.

After the expression $L = V^2/(2\alpha)$ is established, so long as the vehicle speed is the lower speed limit or above and is the higher speed limit or less, the advance vehicle is between the near and far distance limits, and other requirements for releasing the automatic speed control are not established such as the closure of switch SW1, the closure of the switch SW8, the lane-change of the vehicle, the closure of the switch SW4, the lane-change of the advance vehicle and the existence of the third vehicle's interruption between the vehicles, the processor CPU3 calculates the target inter-vehicle distance L (step 52 in FIG. 5f) by substituting the continually varying vehicle speed and the inter-vehicle distance La detected by the image extraction (step 41 in FIG. 5e and FIG. 7) processing in the CPU2 into the foregoing expression, compares the inter-vehicle distance La detected by the CPU2 with the target distance L (step 53 in FIG. 5f), performs the control for increasing speed if La is greater than L (step 54), and performs the control for decreasing the speed if La is L or less (step 55). The control for increasing or decreasing speed has been disclosed, in detail, in Japanese Patent Laid-Open Print No. Sho 62(1987)-153531.

During the control for decreasing speed, the danger degree D which is expressed as K·Vr/La where K is a constant and Vr is a speed of the vehicle relative to the speed of the advance vehicle which is represented by the expression of (the speed of the vehicle—the speed of the advance vehicle). The relationship between the danger degree D and the inter-vehicle distance at plural relative speeds Vr1, Vr2 and Vr3 all of which are positive values is shown in FIG. 4a. The danger degree will increase as the relative speed increases and the inter-vehicle distance decreases. If the danger degree D exceeds the set value Dbk, the CPU3 provides a signal indicating the shift-down to the automatic transmission 3 (steps 88 and 89). Upon receipt of this signal, the transmission 3 begins to establish the downward shifting to a gear ratio at which the engine brake is effectively available. In summary, the engine braking operation is performed by the downshifting operation of the automatic transmission.

In the following cases, the display CPU3 makes a notification of the change of the control condition to the driver by the alarm or the display on the display CRT1 and thereafter establishes a transfer from a specific mode to another mode.

Transfer to the Lock-on mode

When the inter-vehicle distance La becomes the near distance limit or less (step 44 in FIG. 5e and steps 60 through 63 in FIG. 5f).

When the advance vehicle has changed the lane along which the vehicle is travelling (steps 102 and 103 in FIG. 6 and steps 50 and 60 through 63 in FIG. 5f).

When the vehicle changes its lane (steps 97B and 97D in FIG. 5f and 48A in FIG. 5f / steps 48A and 48B and steps 60 through 63 in FIG. 5f).

When the third vehicle interrupts between the vehicles (steps 104 and 105 in FIG. 6 / steps 51 and steps 60 through 63 in FIG. 5f).

When the brake is actuated (steps 47 in FIG. 5e and steps 60 through 63 in FIG. 5f).

It is noted that when the transfer to the Lock-on mode is completed the speed control is released by bringing the PCV and VPM into off condition in step 13 in FIG. 5b.

Transfer to the constant speed cruising mode

When the inter-vehicle distance La exceeds the far distance limit previously set (steps 58 and 59 in FIG. 5e).

When the vehicle speed exceeds the higher speed limit previously set (steps 58 and 59 in FIG. 5e)

Figure 5G:
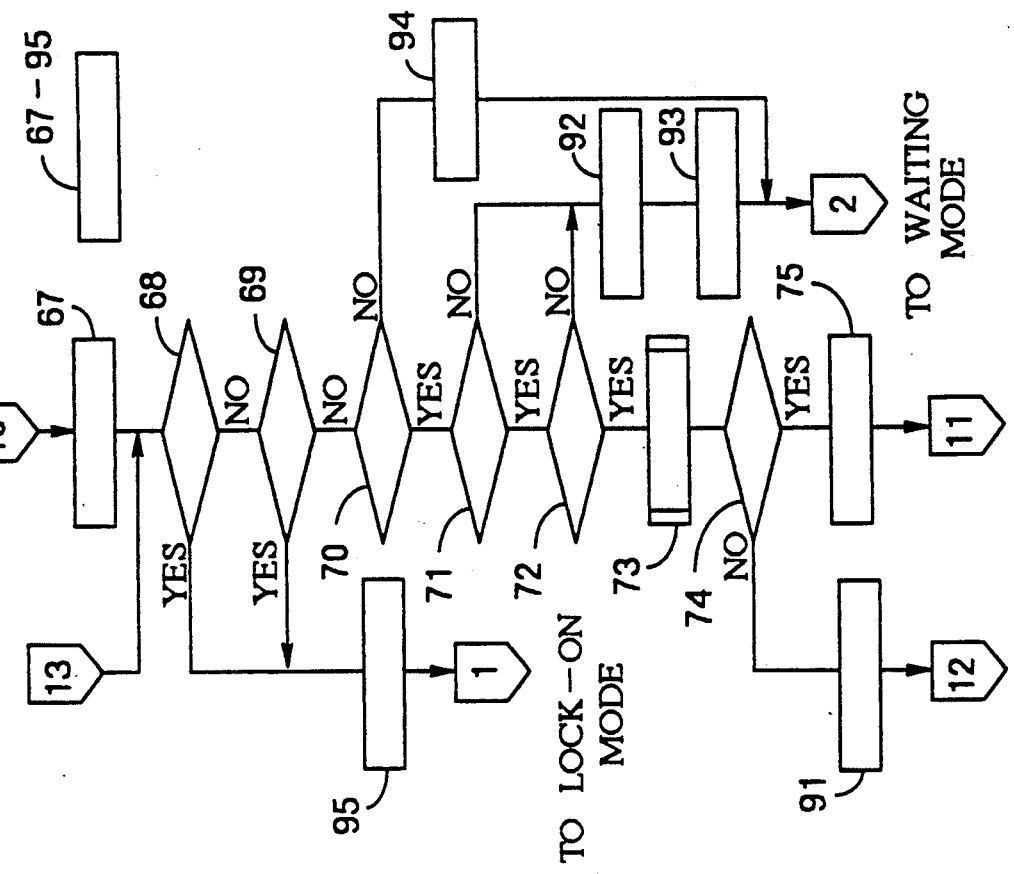

(IV) Constant speed cruising mode (FIGS. 5g and 5h)

The CPU3 begins to order the CPU2 to indicate the phrase "Constant speed cruising" on the display CRT1 (step 67 in FIG. 5g). Next, if the vehicle speed is between the lower and higher speed limits inclusive, the inter-vehicle distance is between the near and far distance limits inclusive and other conditions for cancelling the constant speed cruising mode are not established (wherein both switches SW1 and SW4 are turned on), the CPU3 compares the current or actual vehicle speed V with the reference vehicle speed in the vehicle speed register (step 85 in FIG. 5h). If the answer of this comparison is that the former is less than the latter, the increasing speed control is performed (step 54). If the former is larger or above, the decreasing speed control is performed (step 55). These controls are described in Japanese Patent Laid-open Print No. Sho 62(1987)-153531.

If the transfer to the constant speed cruising mode is made from the inter-vehicle width distance control mode, no speed change is made. The reason is that in such case the reference speed is equal to the vehicle speed at the time when the switch SW7 is manipulated.

During the execution of the constant speed cruising mode, the CPU3 executes the degree of danger D by using the expression $D = K\, Vr/La$ and continues to this mode (steps 81 and 85 through 89 in FIG. 5h) so long as the degree of danger D is the relatively lower value DTH1 or below (cf.FIG. 4a). If the degree of danger is greater than the value DTH1 and is the upper limit DTH2 or less, the degree of danger D is written into the loudness setting reference value register, the alarm-2 is set, the indicator ARO for indicating the advancing vehicle and the phrase "Advance vehicle" appears on the display CRT1, the indicating mode for flickering the aforementioned indications on the display CRT1 according to the timing shown in FIG. 3c (steps 83 and 84), and the constant speed cruising mode is being continued. As a result of the setting of the alarm-2, the CPU3 begins to execute the timer interrupting procedure (TIP) for activating the alarm-2 intermittently based on the timing shown in FIG. 3b. Since the loudness of the buzzer 4 is set to be increased in proportion to the increasing of the degree of danger, the higher the degree of danger becomes, the louder the buzzer 4 sounds intermittently.

The CPU3, when the following transfers are made, informs the driver of the transfer of the control mode by displaying the transfer on the display CRT1.

Transfer to the Lock-on mode

When the degree of danger D exceeds the upper limit DTH2 wherein the the relationship between the inter-vehicle distance between the vehicles and relative speed therebetween enters the danger area such as too high speed of the vehicle relative to the advance vehicle and a short inter-vehicle distance, the processor CPU3 sets the alarm-3, displays the phrase "Constant speed cruising" which is to be flickered intermittently based on the timing of the timer-2 shown in FIG. 3c, and transferes the control to the Lock-on mode (steps 77 and 78 in FIG. 5h). Under the Lock-on mode, the constant speed cruising control is cancelled or is not functioning in function (step 13 in FIG. 5b).

When the switch SW1 or the switch SW4 is manipulated (steps 68 and 69 through 95 in FIG. 5g). The buzzer 4 is activated by the alarm 1.

Transfer to the Waiting mode

When the switch SW3 is turned off (steps 70 through 94 in FIG. 5g). At this time, the alarm 1 activates the buzzer 4.

When the vehicle speed is the higher speed limit or less, or is the lower speed limit or above (steps 71, 72 through 92 and 93). At this time, the buzzer 4 is activated by the alarm-3 and the phrase "Constant speed cruising" on the display CRT1 is flickered intermittently by the indication timer 2.

Transfer to the inter-vehicle distance control mode

Upon closure of the switch SW7 when the inter-vehicle distance is between the near and far distance limits inclusive, the transfer to the inter-vehicle distance control mode is established after the activation of the buzzer 4 by the alarm 1 (steps 76, 79, 80 and 90 in FIG. 5h).

The image extraction in step 17 in FIG. 5b, the image extraction in step 41 in FIG. 5e and the image extraction in step 73 in FIG. 5g are identical with each other. The processing of the image extraction, which is mainly executed by the CPU2, is outlined in FIG. 6. In the image extraction (step 73), the extraction of the lane of the vehicle, the extraction of the advance vehicle, calculation of the inter-vehicle distance between the vehicles and calculation of the relative speed Vr (steps 96, 97A, 98, 100 and RVA occur). Details of each step are disclosed in Japanese Patent Laid-open Print No. Sho 64(1989)-66712. In addition, the CPU2 checks whether the vehicle traverses the dividing line between two lanes and write '1' into or reset the turn flag register if it is true and false respectively (steps 97b, 97C and 97D in FIG. 6). Upon detection of the advance vehicle ahead of the vehicle on the same lane, the inter-vehicle distance between the vehicles is calculated. After this calculation, the result thereof is compared with the result of the previous calculation of the inter-vehicle distance for checking the change of the lane of the advance vehicle and the third vehicle's interruption between the vehicles (steps 102 and 104). In the case of the lane change of the advance vehicle, '1' is written into the advancing vehicle's lane change flag register (step 103) and upon the third vehicle's interruption '1' is written into the third vehicle's interruption flag register (step 105). If no advance vehicle is found ahead of the vehicle on the same lane, the advance vehicle's lane change flag register, the third vehicle's interruption flag register and the advance vehicle detection flag register are reset or cleared (steps 106 through 108).

The CPU2 provides the CPU3 the inter-vehicle distance data, the relative speed data, the data in the advance vehicle detection flag register, the data in the advance vehicle's lane change flag register and the data in the third vehicle's interruption flag register before the ahead scene of the vehicle is displayed on the display CRT1.

On the display CRT1, in addition to the ahead scene of the vehicle, as shown in FIG. 3a, four kinds of phrases-"A.D.", "Inter-vehicle distance", "Constant speed cruising" and "Advance vehicle" are set to be displayed. The phrase "A.D." is lit during the Lock-on mode, the inter-vehicle distance control mode or constant speed cruising mode. The phrase "Inter-vehicle distance" is lit during the inter-vehicle distance control mode. The phrase "Constant speed cruising" is lit during the constant speed cruising mode. The phrase "Advance vehicle" is lit when the advance vehicle is detected within the far distance from the vehicle. Instead of display of each phrase, a lamp corresponding thereto is available.

The following is a summary of how the driver is informed of the vehicle's condition by the buzzer 4 and the display CRT1 on each mode.

On the Lock-on mode without exsistence of the advance vehicle
 The phrase "A.D." is lit.
 The phrases "Inter-vehicle distance", "Constant speed cruising" and "Advancing vehicle" are not lit.
 The buzzer 4 is not activated.
On the Lock-on mode with the exsitence of the advancing vehicle
 The phrase "A.D." is lit.
 The phrase "Advancing vehicle" is lit intermittently by the actuation of the indication timer-1.
 The phrases "Constant speed cruising" and "Inter-vehicle distance" are not lit.
 The indicator ADR is lit intermittently by the actuation of the indication timer 1 for indicating the advance vehicle.
 When the danger degree D is between limits DTH1 and DTH2 the alarm 1 activates the buzzer 4 so as sound it intermittently in such a manner that its loudness is increased as the danger degree D is increased.
On the constant speed cruising mode without exsistence of the advance vehicle
 The phrases "A.D." and "Constant speed control cruising" are lit.
 The phrases "Advancing vehicle" and "Inter-vehicle distance" disappears or is not lit.
 The indicator ARO is disappeared or not lit.
 The buzzer 4 is not activated.
On the constant speed cruising mode with exsistence of the advance vehicle
 The phrases "A.D." and "Constant speed cruising" are lit.
 The phrase "Inter-vehicle" is disappeared or not lit.
 The phrase "Advancing vehicle" and the indicator ARO are flickered or lit intermittently by the actuation of the indication timer-1.
 The buzzer 4 is sounded intermittently so that its sound is increased as the danger degree D increases when the danger degree D is between the limits DTH1 and DTh2.
Upon transfer from the Constant speed cruising mode to the Waiting mode, the Lock-on mode or the inter-vehicle distance mode.
 The buzzer 4 is sounded intermittently at a high speed by the actuation of the alarm 3 for a time and after the elapse of the time is stopped.
 The phrase "Constant speed cruising" is flickered or lit intermittently at a high speed for a time and disappears after the elapse of the time.
On the inter-vehicle distance control mode
 The phrases "A.D.", "Advance vehicle" and "Inter-vehicle distance" are flickered or lit intermittently
 The indicator ARO is lit continuously for indicating the advancing vehicle on the display CRT1.
 The phrase "Constant speed cruising" is disappears
 The buzzer 4 is not activated.
Upon transfer from the Inter-vehicle distance control mode to the Waiting mode, the Lock-on mode or the Constant speed cruising mode.
 The buzzer 4 is sounded intermittently at a high speed by the acuation of the alarm-3 for a time and is stopped after the elapse of the time.
 The phrase "Inter-vehicle distance" is flickered or lit intermittently at a high speed and disappears after the elapse of the time.
Upon manual indication
 In response to the closure(s) of any one of the switches SW4, SW5, SW6 and SW7 when the control is transfered to a specific mode corresponding to the closed switch, the buzzer 4 is once sounded for a time by the actuation of the alarm 1.

Figure 7:
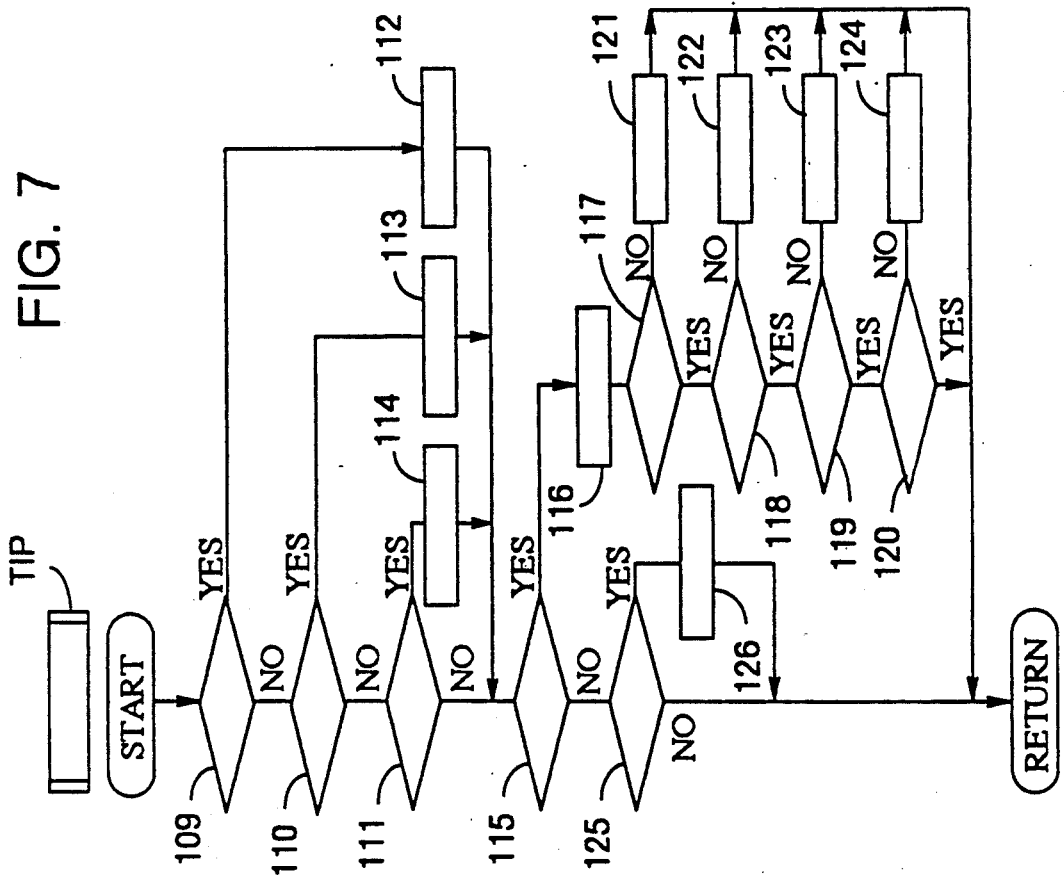
FIG. 7 is a flow chart showing an alarm processing and a display processing of a micro-processors CPU3.

The foregoing activation of the buzzer 4 and the appearances on the display CRT1 both of which are served for informing the conditions around the vehicle to the driver are executed in the timer interruption procedure shown in FIG. 7 subject to the permission of the timer interruption upon the start of the inner or built-in timer before which at least one of the alarm-1, the alarm-2, the alarm-3, the timer-1, the timer-2 and the timer-3 is set by the processor CPU3.

According to the control operation of the aforementioned processor CPU3, during the Lock-on mode under which the lane of the vehicle and the advance vehicle are displayed, upon the closure of the switch SW7 by the driver when the inter-vehicle distance and the speed of the vehicle are adequate or suitable, the speed of the vehicle and the inter-vehicle distance at this time are stored respectively in the reference vehicle speed register and the reference inter-vehicle distance register (steps 24 through 27 in FIG. 5c), thereby initiating the vehicle speed control under the inter-vehicle distance control mode. Under this mode, the target inter-vehicle distance calculation function expressed as $L=V^2/(2\alpha)$ is determined (steps 35 through 37). Thereafter, based on the varying vehicle speed, the corresponding target inter-vehicle distance L is calculated by the function and the throttle valve is controlled to be in a more opened condition if L is less than La or more closed condition if L is greater than La so that the inter-vehicle distance La detected by CPU2 becomes equal to the target inter-vehicle distance L (steps 85 through 87 in FIG. 5h). Furthermore, the danger degree D is calculated by using the foregoing expression or function based on the relative speed Vr between the vehicles and the actual inter-vehicle distance La, and if the resulting danger degree D exceeds the upper limit DTH2 the transmission begins to make a shift down operation, thereby applying the strong or sufficient making force to the vehicle and increasing the deceleration (steps 88 and 89 in FIG. 5h).

If the inter-vehicle distance La exceeds the far distance limit or the vehicle speed exceeds the higher limit, the constant speed cruising mode is established automatically wherein the vehicle speed is kept at the value in the reference vehicle speed register (steps 45, 46 through 59, 67 in FIG. 5g and 85 through 87 in FIG. 5h).

During the travel of the vehicle at a constant speed, upon the closure of the switch SW7 by the driver when the advancing vehicle is between the near and far distance limits inclusive, the target inter-vehicle distance L is calculated based on the target inter-vehicle distance calculation function expressed as $L=V^2/(2\alpha)$ which has been set under the latest inter-vehicle distance mode and the vehicle speed is adjusted so that the current or actual vehicle speed may become equal to the resulting or newly calculated inter-vehicle distance L. In brief, the aforementioned inter-vehicle distance mode is again executed.

Thus, despite of the travel of the vehicle under the inter-vehicle distance mode, the constant speed cruising mode is established automatically when it is considered to be preferable in light of the conditions on the lane. In addition, even under the constant speed cruising mode, when the inter-vehicle distance control mode is considered to be preferable due to the coming of the vehicle near the advance vehicle, the inter-vehicle distance control mode can be established by turning on the switch SW7. This means that the flexibility lies in the automatic speed control drive wherein the mutual changing between the constant speed cruising mode and the inter-vehicle distance control mode can be established easily.

In another embodiment of the present invention, if the danger degree D exceeds the upper limit DTH2, in addition to the engine brake operation, wheel brake pressure corresponding the danger degree D is employed for the deceleration. To this end, a mechanism or device has to be provided on to the vehicle for the anti-skid control or other slip slip control. In this embodiment, the CPU3 is designed to be able to establish automatically the inter-vehicle distance control mode. This establishment is shown in FIG. 8, which is corresponded to FIG. 5h. According to the procedure in FIG. 8, during the constant speed cruising mode, if the inter-vehicle distance La becomes the far distance limit La or less, the inter-vehicle distance mode is established automatically (steps 79 through 90 in FIG. 8 and 32 in FIG. 5d). Under resulting mode, if the inter-vehicle distance La exceeds the far distance limit or the vehicle speed V exceeds the higher speed limit, the constant speed cruising mode is established automatically (steps 45, 46, 58 and 59 in FIG. 5e and 67 in FIG. 5g). Thus, transfer from the constant speed cruising mode to the inter-vehicle distance control mode and vice versa can be established easily.

Obviously, numerous modifications and variations of the present invention are possible in light of the above teachings. It is therefore to be understood that within the scope of the appended claims, the invention may be practiced otherwise than as specifically described herein.

What is claimed is:

1. A vehicle cruising control device comprising:
   detecting means for detecting the current speed of a first vehicle;
   measuring means for measuring current inter-vehicle distance between said first vehicle and a second advance vehicle;
   calculating means for calculating the relative speed between the first vehicle and the second advance vehicle and for calculating a degree of danger based on said distance and said relative speed;
   inter-vehicle distance control means for maintaining the inter-vehicle distance between the first vehicle and the second advance vehicle at a predetermined distance based on an output from said measuring means when said degree of danger determined by said calculating means exceeds a predetermined value;
   constant speed control means for maintaining the speed of the first vehicle at a selected speed based on an output from said detecting means when said degree of danger is less than said predetermined value;
   control means for operating one of said inter-vehicle distance control means and said constant speed control means exclusive of the other based on said degree of danger; and
   switching means for selectively activating either one of said constant speed control means and said inter-vehicle distance control means regardless of said degree of danger.

2. A vehicle cruising control device as set forth in claim 1, wherein said switching means turns off said inter-vehicle distance control means when the current inter-vehicle distance is less than said predetermined distance, the advance vehicle changes to a travel lane different form that of said first vehicle, a third vehicle moves between said first and second vehicles or a brake pedal is depressed.

3. A vehicle cruising control device as set forth in claim 1, wherein said switching means turns on said constant speed control means after turning off said inter-vehicle distance control means when the current inter-vehicle distance between the first and second vehicles exceeds a predetermined distance.

4. A vehicle cruising control device as set forth in claim 1, wherein said inter-vehicle distance control means initiates a braking value to reduce the current distance between said first and second vehicles when said inter-vehicle distance control means is turned on by said switching means when the inter-vehicle distance between the vehicles is less than said predetermined distance.

5. A vehicle cruising control device as set forth in claim 1, further comprising display means for displaying a picture image of said advance vehicle.

6. A vehicle cruising control device as set forth in claim 1, further comprising buzzer means operatively connected to said constant speed control means and said inter-vehicle distance control means for sounding a signal upon turning on and off of either of said constant speed control means and said inter-vehicle distance control means.

* * * * *